(12) United States Patent
Burdette et al.

(10) Patent No.: US 11,236,003 B2
(45) Date of Patent: Feb. 1, 2022

(54) METHODS FOR CONTROLLING SEPARATION BETWEEN GLASSES DURING CO-SAGGING TO REDUCE FINAL SHAPE MISMATCH THEREBETWEEN

(71) Applicant: CORNING INCORPORATED, Corning, NY (US)

(72) Inventors: Steven Roy Burdette, Big Flats, NY (US); Anurag Jain, Painted Post, NY (US); Stephane Poissy, Brunoy (FR); Zheming Zheng, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 109 days.

(21) Appl. No.: 16/757,078

(22) PCT Filed: Oct. 16, 2018

(86) PCT No.: PCT/US2018/056107
§ 371 (c)(1),
(2) Date: Apr. 17, 2020

(87) PCT Pub. No.: WO2019/079315
PCT Pub. Date: Apr. 25, 2019

(65) Prior Publication Data
US 2020/0262733 A1 Aug. 20, 2020

Related U.S. Application Data

(60) Provisional application No. 62/736,791, filed on Sep. 26, 2018, provisional application No. 62/574,082, filed on Oct. 18, 2017.

(51) Int. Cl.
*C03B 23/035* (2006.01)
*C03B 23/025* (2006.01)
*C03B 23/027* (2006.01)

(52) U.S. Cl.
CPC ........ *C03B 23/027* (2013.01); *C03B 23/0352* (2013.01)

(58) Field of Classification Search
CPC ..................... C03B 23/035; C03B 23/0256
See application file for complete search history.

(56) References Cited

U.S. PATENT DOCUMENTS 1,999,558 A 4/1935 Black
2,003,383 A 6/1935 Miller
(Continued)

FOREIGN PATENT DOCUMENTS

DE 102006042538 A1 3/2008
EP 0414232 A1 2/1991
(Continued)

OTHER PUBLICATIONS

International Search Report and Written Opinion of the International Searching Authority; PCT/US2018/056107; dated Jan. 23, 2019; 14 Pages; European Patent Office.
(Continued)

*Primary Examiner* — Cynthia Szewczyk
(74) *Attorney, Agent, or Firm* — Frank B. Riggs; William M. Johnson

(57) ABSTRACT

Embodiments of the disclosure relate to a method of controlling the flow of fluid, such as air, between a stack of glass sheets during a co-sagging process. In embodiments, this involves a particular method and certain mechanical means of applying force at or near the edges and/or corners of a stack of glass sheets during a co-sagging process. In other embodiments, this involves creating low pressure regions at or near the edges and/or corners during the co-sagging process. In particular, controlling the flow of fluid between
(Continued)

glass sheets is particularly suitable for preventing shape mismatch between two glass sheets having different thicknesses and/or compositions.

20 Claims, 13 Drawing Sheets

(56) References Cited

U.S. PATENT DOCUMENTS

| | | | |
|---|---|---|---|
| 3,282,772 A | 11/1966 | Davis, Sr. | |
| 3,300,351 A | 1/1967 | Richardson | |
| 3,592,726 A | 7/1971 | Blizard | |
| 3,801,423 A | 4/1974 | Van et al. | |
| 3,806,400 A | 4/1974 | Van | |
| 4,075,381 A | 2/1978 | Yasuhiko et al. | |
| 4,119,424 A | 10/1978 | Comperatore | |
| 4,124,733 A | 11/1978 | Melling et al. | |
| 4,643,944 A | 2/1987 | Agethen et al. | |
| 4,817,347 A | 4/1989 | Hand et al. | |
| 4,985,099 A | 1/1991 | Mertens et al. | |
| 5,019,443 A | 5/1991 | Hall | |
| 5,178,659 A | 1/1993 | Watanabe et al. | |
| 5,383,900 A | 1/1995 | Krantz | |
| 5,383,990 A | 1/1995 | Tsuji | |
| 5,437,703 A * | 8/1995 | Jacques | C03B 23/035 65/106 |
| 5,667,897 A | 9/1997 | Hashemi et al. | |
| 6,265,054 B1 | 7/2001 | Bravet et al. | |
| 6,280,847 B1 | 8/2001 | Corkhill et al. | |
| 7,638,011 B2 | 12/2009 | Bolognese | |
| 7,871,664 B2 | 1/2011 | O'Connor et al. | |
| 8,448,466 B2 | 5/2013 | Funk et al. | |
| 9,219,803 B2 | 12/2015 | Zhang | |
| 9,375,900 B2 | 6/2016 | Tsuchiya et al. | |
| 9,616,641 B2 | 4/2017 | Cleary et al. | |
| 9,694,563 B2 | 7/2017 | Offermann et al. | |
| 9,919,496 B2 | 3/2018 | Michetti et al. | |
| 10,307,992 B2 | 6/2019 | Lestringant et al. | |
| 11,027,525 B2 | 6/2021 | Oh et al. | |
| 2002/0106519 A1 | 8/2002 | Takahara | |
| 2004/0098946 A1 | 5/2004 | Meerman | |
| 2008/0318028 A1 | 12/2008 | Winstanley et al. | |
| 2010/0295330 A1 | 11/2010 | Ferreira et al. | |
| 2012/0017975 A1 | 1/2012 | Giron et al. | |
| 2012/0025559 A1 | 2/2012 | Offermann et al. | |
| 2012/0094084 A1 | 4/2012 | Fisher et al. | |
| 2013/0295358 A1 | 11/2013 | Paulus et al. | |
| 2014/0017455 A1 | 1/2014 | Takagi et al. | |
| 2014/0093702 A1 | 4/2014 | Kitajima | |
| 2014/0141206 A1 | 5/2014 | Gillard et al. | |
| 2015/0158277 A1 | 6/2015 | Fisher et al. | |
| 2015/0202854 A1 | 7/2015 | Tsuchiya et al. | |
| 2015/0246839 A1 | 9/2015 | Leveque | |
| 2015/0314571 A1 | 11/2015 | Cites et al. | |
| 2016/0060164 A1 | 3/2016 | Kobayashi et al. | |
| 2016/0136929 A1 | 5/2016 | Meiss et al. | |
| 2016/0250825 A1 | 9/2016 | Cleary et al. | |
| 2016/0250982 A1 | 9/2016 | Fisher et al. | |
| 2016/0257094 A1 | 9/2016 | Lestringant et al. | |
| 2016/0279904 A1 | 9/2016 | Sienerth et al. | |
| 2016/0297169 A1 | 10/2016 | Notsu et al. | |
| 2016/0332423 A1 | 11/2016 | Yamada et al. | |
| 2016/0354996 A1 | 12/2016 | Alder et al. | |
| 2017/0008377 A1 | 1/2017 | Fisher et al. | |
| 2017/0057205 A1 | 3/2017 | Notsu et al. | |
| 2017/0190152 A1 | 7/2017 | Notsu et al. | |
| 2017/0341970 A1 | 11/2017 | Ishida et al. | |
| 2018/0104932 A1 | 4/2018 | Lu | |
| 2018/0207911 A1 | 7/2018 | Lampman et al. | |
| 2018/0370194 A1 | 12/2018 | Claireaux et al. | |
| 2019/0134953 A1 | 5/2019 | Oh et al. | |

FOREIGN PATENT DOCUMENTS

| | | | |
|---|---|---|---|
| EP | 0445672 A1 | 9/1991 | |
| EP | 618068 A1 | 10/1994 | |
| EP | 2695864 A1 | 2/2014 | |
| EP | 3078488 A1 | 10/2016 | |
| EP | 3450161 B1 | 4/2020 | |
| FR | 3012073 A1 | 4/2015 | |
| GB | 1359170 A | 7/1974 | |
| GB | 2011316 A | 7/1979 | |
| GB | 2078169 A | 1/1982 | |
| JP | 64085757 A | 3/1989 | |
| JP | 01230439 A * | 9/1989 | ......... C03B 23/0256 |
| JP | 06256031 A * | 9/1994 | ........... C03B 23/035 |
| JP | 2001039743 A | 2/2001 | |
| JP | 2007197288 A | 8/2007 | |
| JP | 2016008161 A | 1/2016 | |
| JP | 6000293 B2 | 9/2016 | |
| JP | 2020-506860 A | 3/2020 | |
| WO | 2007/077460 A1 | 7/2007 | |
| WO | 2010/102282 A1 | 9/2010 | |
| WO | 2012/073030 A1 | 6/2012 | |
| WO | 2012/137742 A1 | 10/2012 | |
| WO | 2012/176813 A1 | 12/2012 | |
| WO | 2013107706 A1 | 7/2013 | |
| WO | 2014/044516 A1 | 3/2014 | |
| WO | 2014/054468 A1 | 4/2014 | |
| WO | 2014126251 A1 | 8/2014 | |
| WO | 2014126252 A1 | 8/2014 | |
| WO | 2014/168246 A1 | 10/2014 | |
| WO | 2014209861 A1 | 12/2014 | |
| WO | 2015/010922 A1 | 1/2015 | |
| WO | 2015/059407 A1 | 4/2015 | |
| WO | 2015/092385 A1 | 6/2015 | |
| WO | 2015/119192 A1 | 8/2015 | |
| WO | 2015/119194 A1 | 8/2015 | |
| WO | 2016/093031 A1 | 6/2016 | |
| WO | 2017055470 A1 | 4/2017 | |
| WO | 2017103471 A1 | 6/2017 | |
| WO | 2017106081 A1 | 6/2017 | |
| WO | 2018/075288 A1 | 4/2018 | |
| WO | 2018095693 A1 | 5/2018 | |
| WO | 2018134608 A1 | 7/2018 | |
| WO | 2018138503 A1 | 8/2018 | |

OTHER PUBLICATIONS

Linnhofer et al. "Lightweight conventional automotive glazing", IBEC '97, Automotive Glass and Glazing, 1997. pp. 25-27.

Linnhofer et al. "Resistance of glazings to stone impact", Autotest'96, Jul. 1996. 4 pgs.

Shetty, "Failure probability of laminated architectural glazing due to combined loading of wind and debris impact", Engineering Failure Analysis 36, 2014. pp. 226-242.

European Patent Application No. 18708305.0; Office Action dated Feb. 14, 2020; European Patent Office; 6 Pgs.

* cited by examiner

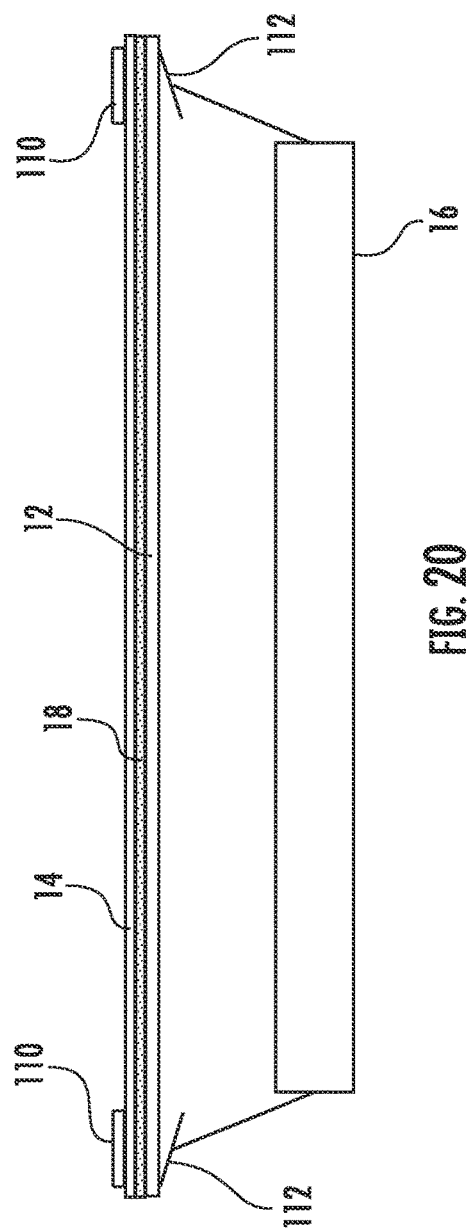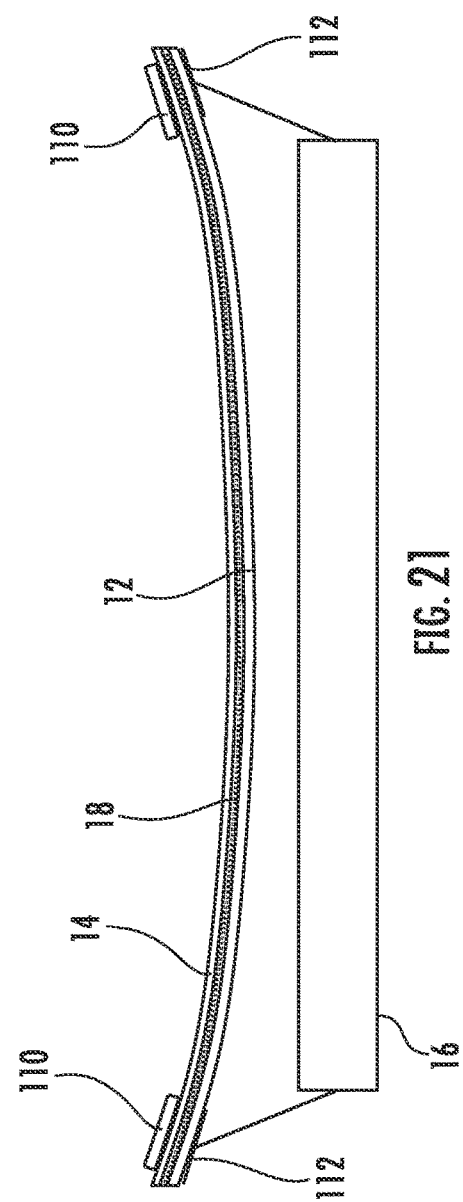

METHODS FOR CONTROLLING SEPARATION BETWEEN GLASSES DURING CO-SAGGING TO REDUCE FINAL SHAPE MISMATCH THEREBETWEEN

CROSS-REFERENCE TO RELATED APPLICATIONS

This application is a national stage application under 35 U.S.C. § 371 of International Application No. PCT/US2018/056107, filed on Oct. 16, 2018, which claims the benefit of priority under 35 U.S.C. § 119 of U.S. Provisional Application Ser. No. 62/736,791 filed on Sep. 26, 2018, and U.S. Provisional Application Ser. No. 62/574,082 filed on Oct. 18, 2017, the content of each are relied upon and incorporated herein by reference in their entirety.

BACKGROUND

The disclosure relates generally to forming a curved glass laminate article, and specifically to processes for co-forming (e.g., co-sagging) glass sheets while controlling separation of the glass sheets to reduce shape mismatch.

Curved glass laminate sheets or articles find use in many applications, including vehicle or automotive window glass. Typically, curved glass sheets for such applications have been formed from relatively thick sheets of glass material. To improve shape consistency between individual glass layers of the laminate article, the glass materials may be shaped to the desired shape/curvature via a co-forming process, such as a co-sagging process. Applicant has found that traditional co-sagging processes may produce undesirable characteristics (e.g., shape mismatch) in the curved glass sheets, the severity of which appears to increase when the co-sagged pair of glass sheets have different thicknesses, compositions, and/or viscosities.

SUMMARY

In one aspect, embodiments of a process for forming a stack of glass sheets are provided. In the steps of the process, an outer region of a first sheet of glass material is placed into contact with a support surface of a shaping frame. The shaping frame defines an open central cavity surrounded at least in part by the support surface. Further, a second sheet of glass material is placed over the first sheet of glass material. The first sheet of glass material and the second sheet of glass material are both supported by the shaping frame. Then, the flow of fluid in a space between the first sheet of glass material and the second sheet of glass material is controlled at or near one or more of the edges and/or corners of the first and second sheets of glass material. Next, the first sheet of glass material and the second sheet of glass material are heated together while supported by the shaping frame such that central regions of the first and second sheets of glass material deform downward into the open central cavity of the shaping frame.

In another aspect, embodiments of a method of forming a glass laminate article are provided. The method includes a step of placing an outer region of a first sheet of glass material into contact with a support surface of a shaping frame. The shaping frame defines an open central cavity surrounded at least in part by the support surface. Then, a second sheet of glass material is placed over the first sheet of glass material. Further, the first sheet of glass material and the second sheet of glass material are both supported by the shaping frame. The flow of fluid in a space between the first sheet of glass material and the second sheet of glass material is controlled at or near one or more of the edges and/or corners of the first and second sheets of glass material. Then, the first sheet of glass material and the second sheet of glass material are heated together while supported by the shaping frame such that central regions of the first and second sheets of glass material deform downward into the open central cavity of the shaping frame. Thereafter, the first sheet of glass material is bonded to the second sheet of glass material.

An additional embodiment of the disclosure relates to a curved glass laminate article including the first sheet of glass material according to one of the described embodiments, the second sheet of glass material according to one of the described embodiments, and a polymer interlayer that binds the first sheet of glass material to the second sheet of glass material.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

FIG. 20 depicts a flexible weighted ring placed over a stack of glass sheets prior to co-sagging, according to an exemplary embodiment.

FIG. 21 depicts the flexible weighted ring of FIG. 20 after the stack of glass sheets has been co-sagged, according to an exemplary embodiment.

DETAILED DESCRIPTION

Embodiments of the disclosure relate to a method of controlling the pressure or the flow of fluid, such as air, between a stack of glass sheets during a co-sagging process. In embodiments, this involves a particular method and certain mechanical means of applying force at or near the edges and/or corners of a stack of glass sheets during a co-sagging process. In other embodiments, this involves creating low pressure regions at or near the edges and/or corners during the co-sagging process. In particular, controlling the pressure or the flow of fluid between glass sheets is particularly suitable for preventing shape mismatch between two glass sheets having different thicknesses, compositions, and/or viscosities.

In certain embodiments, a force is applied via at least one of a mechanical clip, a hanging weight structure, a plurality of counterweights, a manually-operated or automated press, a flexible weighted ring or layer, or the like. The force is sufficient to reduce or eliminate edge or corner lifting of the upper glass sheet from the lower glass sheet. Thus, a fluid film (e.g., an air film) can be maintained between the sheets such that suction forces between the sheets reduce shape mismatch of the glass sheets that might otherwise be caused from fluid (e.g., air) being introduced between the glass sheets due to edge or corner lifting of the upper glass sheet from the lower glass sheet.

In other embodiments, high pressure fluid, such as air, is blown towards the edges and/or corners of the glass sheets so as to lower the pressure at the edges and/or corners of the glass sheets. The lower pressure helps to seal the edges and/or corners to prevent a loss of suction between the glass sheets.

As will be described more fully below, controlling the pressure or the fluid flow between glass sheets during a co-sagging process helps to limit edge/corner lifting and reduce shape mismatch. The reduction in shape mismatch was confirmed via computer modeling and experimentation.

In general, conventional processes for forming curved, laminated glass articles involve heating a pair of stacked glass plates or sheets on a forming ring to near the softening temperature of the glass until the glass has sagged to the desired shape and depth. A separation material can be used as a separation layer between the two glass sheets preventing the glass sheets being bonded/fused together during heating. While such co-sagging processes have a variety of advantages (e.g., improving shape matching between the glass sheets that will form the laminate, efficient use of heating equipment, process throughput, etc.), co-sagging two different glass materials can cause shape mismatches as a result of differences in thickness, composition, viscosity, and, consequently, sagging rates of the two glasses.

Figure 16:
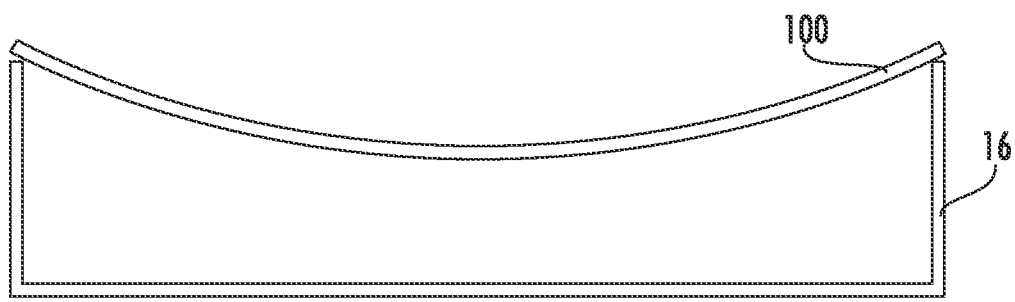
FIG. 16 illustrates the degree of sagging experienced by a thick glass sheet within a heating station.
Figure 17:
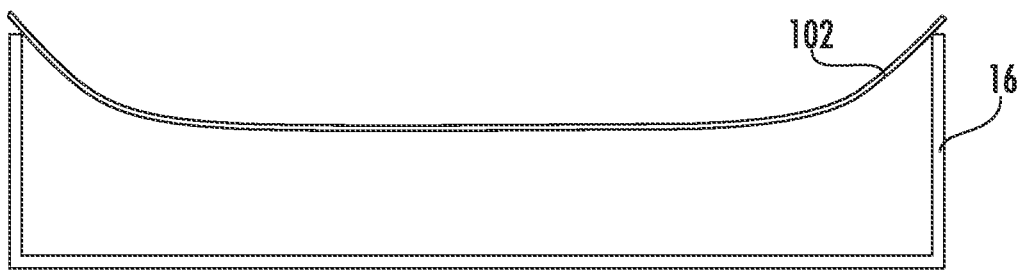
FIG. 17 illustrates the degree of sagging experienced by a thin glass sheet within a heating station.

The shape mismatch between two glasses of different composition and thickness is shown in FIGS. 16 and 17. As shown in FIG. 16, when a sheet of glass is sagged under gravity by itself, a thicker glass sheet 100 will produce a more parabolic shape. However, as shown in FIG. 17, a thinner glass sheet 102 will produce a "bath tub" like shape where curvature is greatest near the edges and is reduced near the center. As a result, when the two sheets are co-sagged, especially when the thinner sheet is on top of the thicker sheet, the thinner sheet may pull up at or near the edges and corners of the co-sagging sheets. As will be understood, the difference in sag shape illustrated in FIGS. 16 and 17 generally will increase as the thickness difference and the viscosity difference between the two glass sheets increases, thereby increasing the shape mismatch between the co-sagging sheets.

Applicant has found that a suction effect exists as a result of low pressure created between glass sheets during the co-sagging process. This suction effect is lost or reduced when edge lifting allows fluid (typically air) to enter between the glass sheets. For example, as described further below, a pressure gradient exists in the space between two glass sheets during co-forming. At the edge of the sheets, the pressure will be relatively large (i.e., atmospheric pressure or the pressure of the environment surrounding the glass sheets), while the pressure will be relatively low near the center of the glass sheets. As gravity drives the bending—and separation—of the glass sheets during co-forming, the low pressure in the internal region of the space between the glass sheets will oppose separation of the glass sheets due to the suction effect. Because the pressure at the edges of the glass sheets will generally be at atmospheric pressure, a greater pressure gradient between the edge of the glass sheets and the center of the glass sheets will result in a lower pressure in this internal region, and thus a greater suction effect. The closer the edges and/or corners of the glass sheets are kept during co-forming, the slower the speed at which fluid (e.g., air) can enter the internal region and decrease this pressure gradient. In other words, the larger the separation at the edges and/or corners of the glass sheets, the faster the ambient fluid or air can penetrate the space between the sheets and the faster the pressure gradient is diminished, resulting in a diminished suction effect. Thus, embodiments of the disclosure describe ways in which the flow of fluid into a space between glass sheets can be controlled so as to maintain the suction effect between the glass sheets. In one embodiment, the flow of fluid between the glass sheets is controlled by applying a force at or near one or more of the edges and/or corners of the stack of glass sheets. For example, Applicant has found that a relatively small force of, e.g., less than 1 N at locations where corner lifting or edge lifting occurs, can prevent the loss of suction between the glass sheets, which is thought to cause or exacerbate shape mismatch. Applicant has developed multiple systems that apply the requisite amount of force to address corner and edge lifting while also reducing or eliminating shape mismatch between the glass sheets. In other embodiment, the flow of fluid between the glass sheets is controlled by blowing fluid toward the edges and/or corners of the glass sheets so as to create low pressure regions between the glass sheets at the edges and/or corners. These low pressure regions help seal the edge and corners of the glass sheets so that fluid does not flow between the sheets. In embodiments, fluid is blown from under the lower glass sheet and/or from above the upper glass sheet to create the low pressure regions. Ultimately, each of the following means of controlling the flow of fluid between the co-sagged glass sheets reduces the shape mismatch of the final co-sagged glass sheets, even with large differences in glass sheet thickness and glass sheet viscosities.

Figure 1:
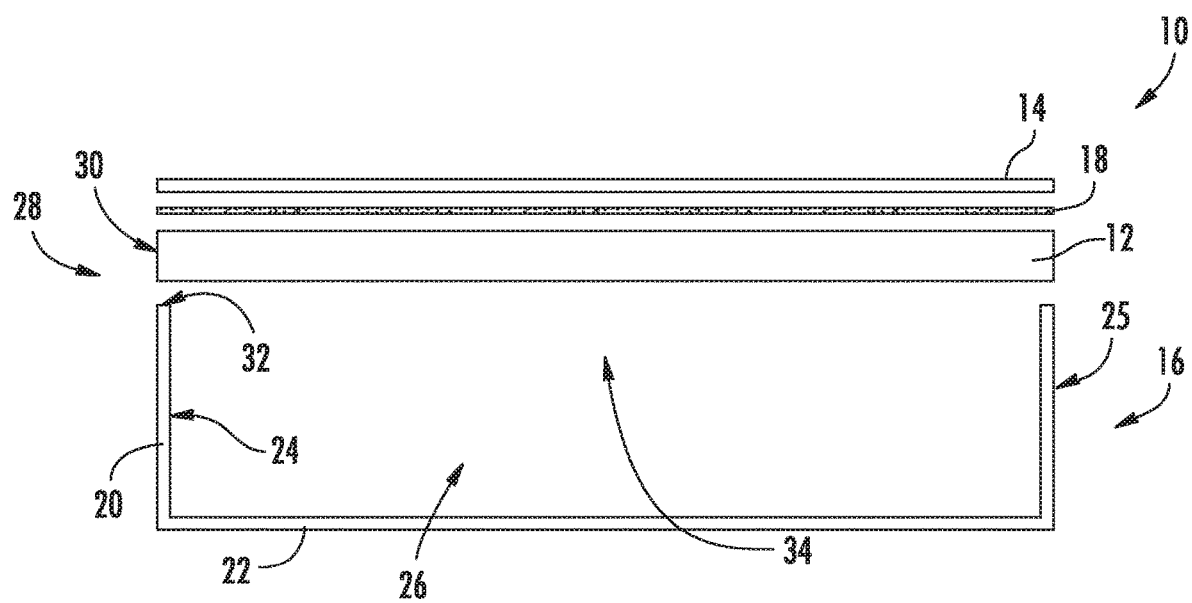
FIG. 1 is a schematic, cross-sectional, exploded view showing stacking of glass sheets for co-sagging, according to an exemplary embodiment.
Figure 2:
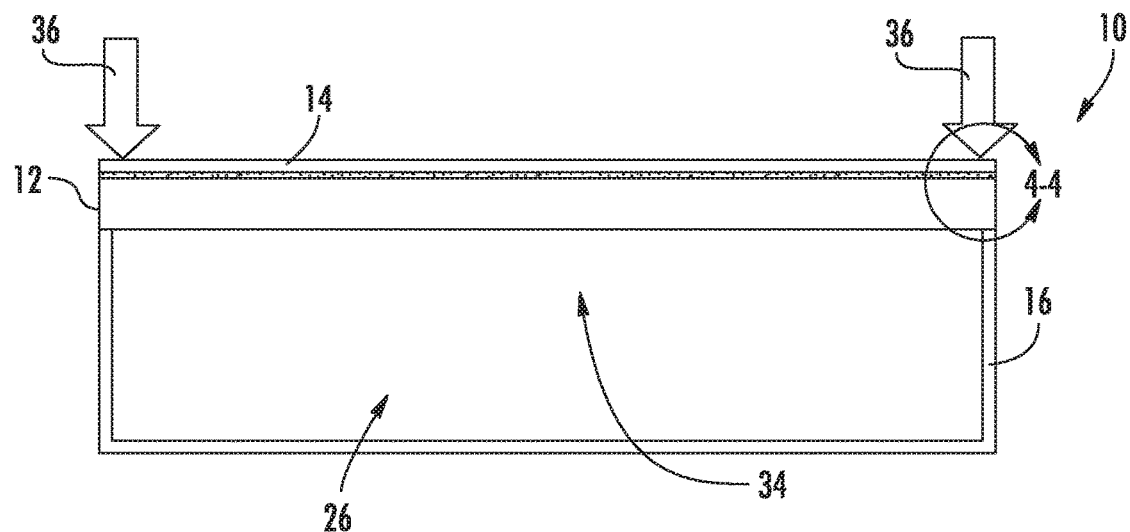
FIG. 2 is a schematic, cross-sectional view showing stacked glass sheets supported on a bending ring, according to an exemplary embodiment.

Referring to FIG. 1 and FIG. 2, a system and process for forming a curved glass article is shown according to an exemplary embodiment. In general, system 10 includes one or more sheets of glass material, shown as a pair of glass sheets 12 and 14, supported by a shaping frame, shown as bending ring 16. It should be understood that bending ring 16 may have a wide variety of shapes selected based on the shape of the glass sheets to be supported, and use of the term ring does not necessarily denote a circular shape.

As shown in FIG. 1, bending ring 16 includes a support wall, shown as sidewall 20, and a bottom wall 22. Sidewall 20 extends upward and away from bottom wall 22. The radially inward facing surface 24 of sidewall 20 defines an open central region or cavity 26, and an upward facing surface of bottom wall 22 defines the lower end of cavity 26. A radially outward facing surface 25 is opposite of inward facing surface 24.

As shown in FIGS. 1 and 2, a separation material 18 is optionally deposited between the lower glass sheet 12 and the upper glass sheet 14. In general, separation material 18 is a material, such as hexagonal boron nitride, graphite, molybdenum disulfide, polytetrafluoroethylene, talc, calcium fluoride, cesium fluoride, tungsten disulfide, etc., that helps prevent sheets 12 and 14 from bonding together during the heating stages of the curve formation. While the separation material 18 is depicted in FIGS. 1 and 2 as a coherent layer, the separation material 18 can be, e.g., a powdered ceramic layer, a slurry layer, a foam layer, etc. Further, the separation material 18 can be sprayed, applied, or otherwise deposited onto either a lower surface of the upper glass sheet 14 or an upper surface of the lower glass sheet 12. Thus, when the upper glass sheet 14 is stacked over the lower glass sheet 12, the lower surface of upper glass sheet 14 is in contact with separation material 18, and the upper surface of the lower glass sheet 12 is in contact with the separation material 18. As can be seen in FIGS. 1 and 2, in this arrangement, separation material 18 acts as a barrier between glass layers 12 and 14 during the co-sagging process.

To begin the co-sagging process, an outer region 28 of glass sheet 12 adjacent the outer perimeter edge 30 of the glass sheet is placed into contact with a support surface, shown as upward facing surface 32, of bending ring 16. In this arrangement, glass sheets 12 and 14 are both supported by the contact between upward facing surface 32 with glass sheet 12 such that central regions 34 of glass sheets 12 and 14 are supported over central cavity 26. In the embodiment depicted, the flow of fluid between the glass sheets 12 and 14 is controlled via the application of a force 36 at or near the edges and/or corners of the glass sheets 12 and 14. As will be described more fully below, the force 36 can be applied a mechanical clip, a weight, a press, or the like. However, as mentioned above, the flow of fluid between the glass sheets 12 and 14 could additionally or alternatively be controlled by creating low pressure regions at the edges and/or corners of the glass sheets 12 and 14, and embodiments of this means of control are provided later in the disclosure.

Figure 3:
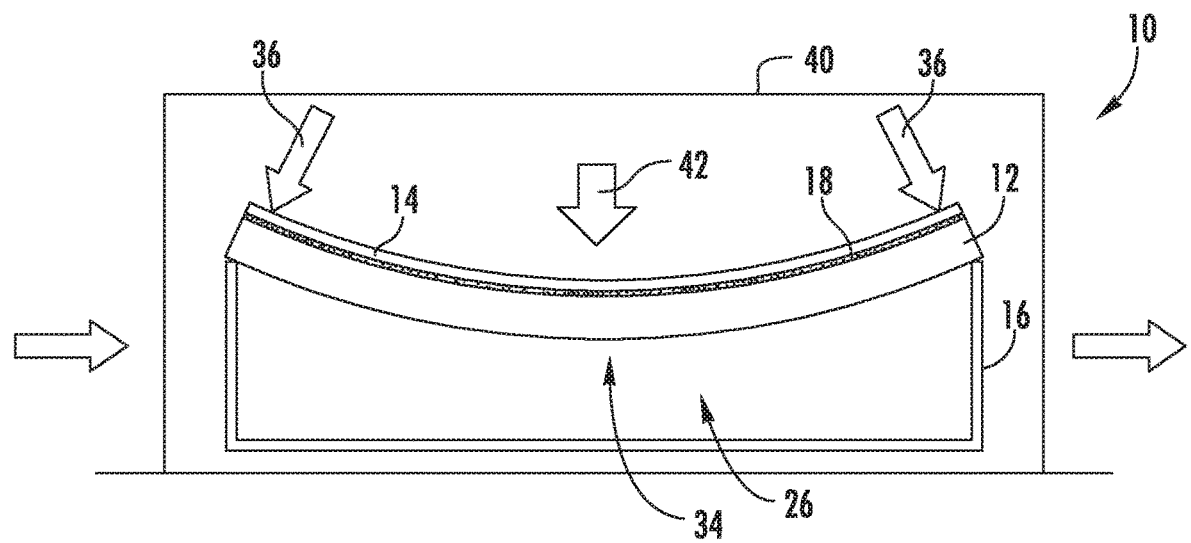
FIG. 3 is a cross-sectional view showing the stacked glass sheets of FIG. 2 supported by a bending ring within a heating station, according to an exemplary embodiment.

Next, referring to FIG. 3, bending ring 16, supported glass sheets 12 and 14 and separation material 18 are moved into a heating station 40, such as an oven or serial indexing lehr. Within heating station 40, glass sheets 12 and 14, separation material 18 and bending ring 16 are heated (e.g., to near or at the softening temperature of the glass material of glass sheets 12 and 14) while glass sheets 12 and 14 are supported on bending ring 16. As glass sheets 12 and 14 are heated, a shaping force, such as the downward force 42, causes central region 34 of glass sheets 12 and 14 to deform or sag downward into central cavity 26 of bending ring 16. The force 36 prevents the edges of the upper glass sheet 14 from pulling away from the lower glass sheet 12 during the co-sagging process.

In specific embodiments, the downward force 42 is provided by gravity. In some embodiments, the downward force 42 may be provided via air pressure (e.g., creating a vacuum on the convex side of glass sheets 12 and 14, blowing air on the concave side of glass sheets 14, via press) or through a contact-based molding machine. Regardless of the source of the deforming force 42, this procedure results in glass sheets 12 and 14 having a curved shape as shown in FIG. 3.

After a period of time determined to allow glass sheets 12 and 14 to develop the desired curved shape, bending ring 16 along with the supported glass sheets 12 and/or 14 are then cooled to room temperature. Thus, the shaped, deformed or curved glass sheets 12 and 14 are allowed to cool, fixing glass sheets 12 and 14 into the curved shape created within heating station 40. Once cooled, curved glass sheets 12 and 14 are removed from bending ring 16 and another set of flat glass sheets are placed onto bending ring 16, and the shaping process is repeated. Following shaping, the now curved glass sheets 12 and 14 are bonded together (e.g., typically via a polymer interlayer) into the final curved glass, laminate article.

Figure 4:
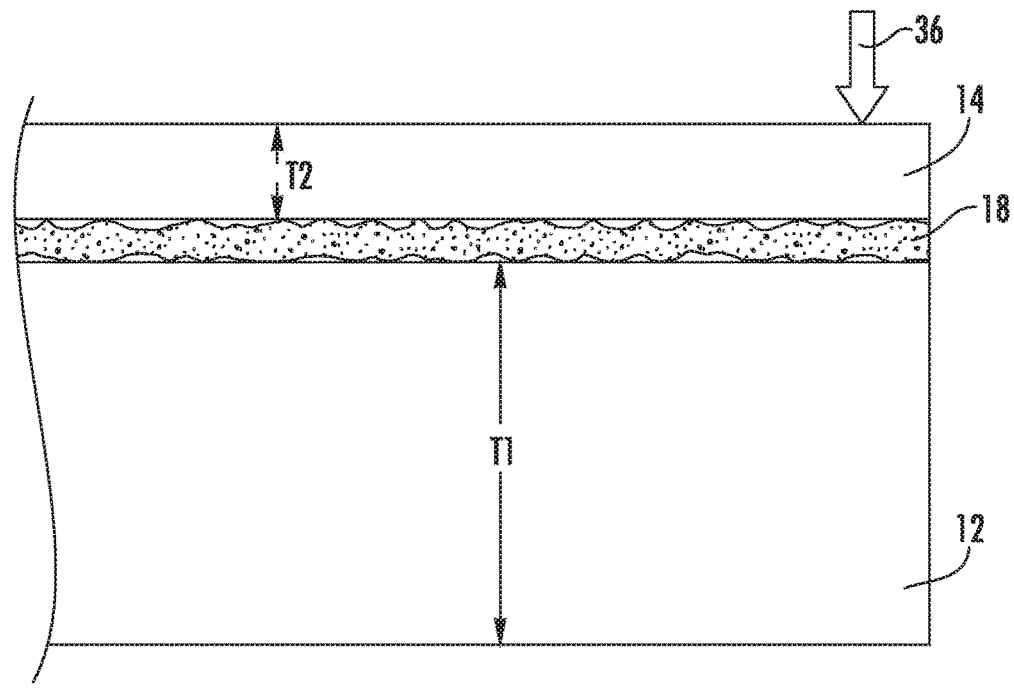
FIG. 4 is a detailed view of the stacked glass sheets of FIG. 2, according to an exemplary embodiment

In particular embodiments, glass sheets 12 and 14 may be particularly susceptible to edge and/or corner separation as a result of large thickness differences and/or material differences (e.g., viscosities) between glass sheets 12 and 14. Referring to FIG. 4, in specific embodiments, the force 36 enables co-sagging of glass sheets 12 and 14 with reduced edge and corner separation even where a large thickness or viscosity differential exists between the glass sheets 12 and 14. As shown in FIG. 4, glass sheet 12 has a thickness, shown as T1, and glass sheet 14 has a thickness, shown as T2. In embodiments, T1 is different from T2, and specifically T1 is greater than T2. In various embodiments, T1 is at least 2.5 times greater than T2, and in other embodiments, T2 is at least 2.5 times greater than T1. In specific embodiments, T1 is between 1.5 mm and 4 mm, and T2 is between 0.3 mm and 1 mm, and in even more specific embodiments, T2 is 0.7 mm or less, or is less than 0.6 mm. In specific embodiments: T1 is 1.6 mm and T2 is 0.55 mm; T1 is 2.1 mm and T2 is 0.55 mm; T1 is 2.1 mm and T2 is 0.7 mm; T1 is 2.1 mm and T2 is 0.5 mm; T1 is 2.5 mm and T2 is 0.7 mm. In the embodiment shown in FIG. 4, the thicker glass sheet 12 is located below the thinner glass sheet 14 when stacked on bending ring 16. However, it should be understood that in other embodiments, the thinner glass sheet 14 could instead be located below thicker glass sheet 12 in the stack supported by bending ring 16.

It is believed that when glass sheets of different materials are co-sagged together, viscosity differences between the two materials at the co-sagging temperature results in edge and/or corner lifting in the regions where sagging shape is different (see e.g., FIGS. 16 and 17). Applicant has determined that applying a force at edge and/or corners of the glass sheets decreases or eliminates shape mismatch when co-sagging glass sheets of different materials and/or thicknesses.

Thus, in various embodiments, glass sheet 12 is formed from a first glass material/composition, and glass sheet 14 is formed from a second glass material/composition different from the first glass material. In some such embodiments, the first glass material has a viscosity that is different from the viscosity of the second glass material during heating within heating station 40. While a wide variety of glass materials may be used to form glass sheets 12 and/or 14, in specific embodiments, the first glass material of sheet 12 is a soda lime glass, and the second glass material of sheet 14 is an alkali aluminosilicate glass composition or an alkali aluminoborosilicate glass composition. Additional exemplary materials for glass sheets 12 and 14 are identified in detail below.

Referring initially to the embodiment of controlling the flow of fluid between the glass sheets 12 and 14 via application of a force 26, Applicant has determined that various means of applying a force each allow for co-sagging glass sheets having different thicknesses and/or different material properties while reducing or eliminating shape mismatch between the glass sheets. Without wishing to be bound by theory, Applicant's testing has indicated that the clamping force decreases air flow between the glass sheets 12 and 14, allowing for better suction between glass sheets 12 and 14 such that the glass sheets 12 and 14 are urged to remain together during the co-sagging process. That is, being relatively thicker in size and made of a lower viscosity material, the generally faster sagging lower glass sheet 12 will pull the generally thinner and more viscous upper glass sheet 14 into shape conformity throughout the co-sagging process. In various embodiments described below, a mechanical clip, a weight system, a hanging weight, and a press are provided.

Figure 5:
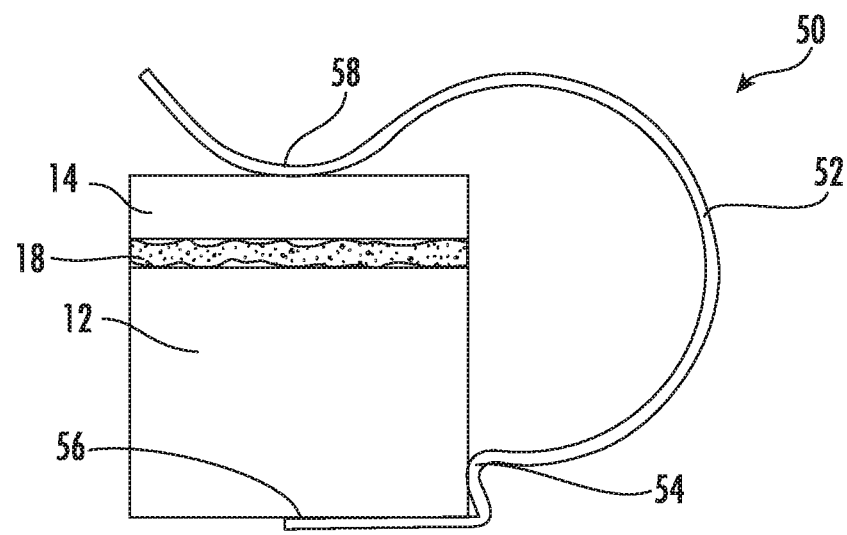
FIG. 5 depicts an embodiment of a clip for applying a force to a stack of glass sheets, according to an exemplary embodiment.

In FIG. 5, an embodiment of a clip 50 is provided. The clip 50 includes a tubular body 52 having a generally C-shaped cross-section. At the lower end of the C-shaped cross-section of the tubular body 52 is an abutment edge 54. Further below the abutment edge 54 is a clamping surface 56, and at the upper end of the C-shaped cross-section of the tubular body 52 is a clamping curve 58. As can be seen in FIG. 5, the clip 50 is attached to the stack of glass sheets 12 and 14 such that the clamping surface 56 is in contact with the lower surface of the lower glass sheet 12 and the clamping curve 58 is in contact with the upper surface of the upper glass sheet 14. The clip 50 is pushed onto the stack of glass sheets 12 and 14 until the abutment edge 54 contacts the lower glass sheet 12.

Figure 6:
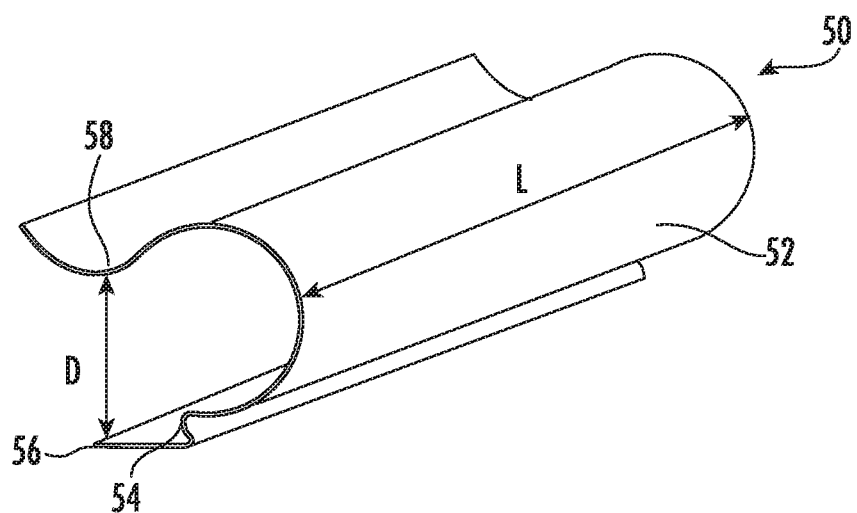
FIG. 6 is a perspective view of a clip for applying a force to a stack of glass sheets, according to an exemplary embodiment.

The tubular body 52 of the clip 50 is shown in greater detail in FIG. 6. The tubular body 52 has a length L. In embodiments, the length L is from 5 mm to 50 mm. In another embodiment, the length L is from 6 mm to 15 mm. However, embodiments are not limited to particular lengths and can varied based on the particular use. It is appreciated that, according to the methods discussed herein, good shape matching between the glass sheets can be achieved even with a clip that is small relative to the size of the glass sheets. A distance D separates the clamping surface 56 and the clamping curve 58. The distance D can be approximately the same as or less than the thickness of the stack of glass sheets 12 and 14. In this way, the distance D can increase when the clip 50 is attached to the stack of glass sheets 12 and 14 and elastically deforms so as to apply a spring clamping force between the clamping surface 56 and the clamping curve 58. In embodiments, the clamping force is 1 N or less over 6 mm. In another embodiment, the clamping force is 0.5 N or less over 6 mm, and in a particular embodiment, the clamping force is 0.4 N over 6 mm. In another embodiment, the clamping force is at least about 0.05 N over 6 mm. Further, because the clip 50 is attached to the glass sheets 12 and 14 during the co-sagging process, the clip 50 is able to withstand typical co-sagging temperatures (e.g., 500° C. to 650° C.). In an embodiment, the clip 50 is made from a high temperature nickel-based, iron-based, or iron/nickel-based alloys, such as Inconel 600 or Haynes 120, that maintain their spring stiffness at co-sagging temperatures. Advantageously, the clip 50 as described has low thermal mass such that clip 50 does not have a significant thermal impact on the glass sheets 12 and 14.

Figure 13:
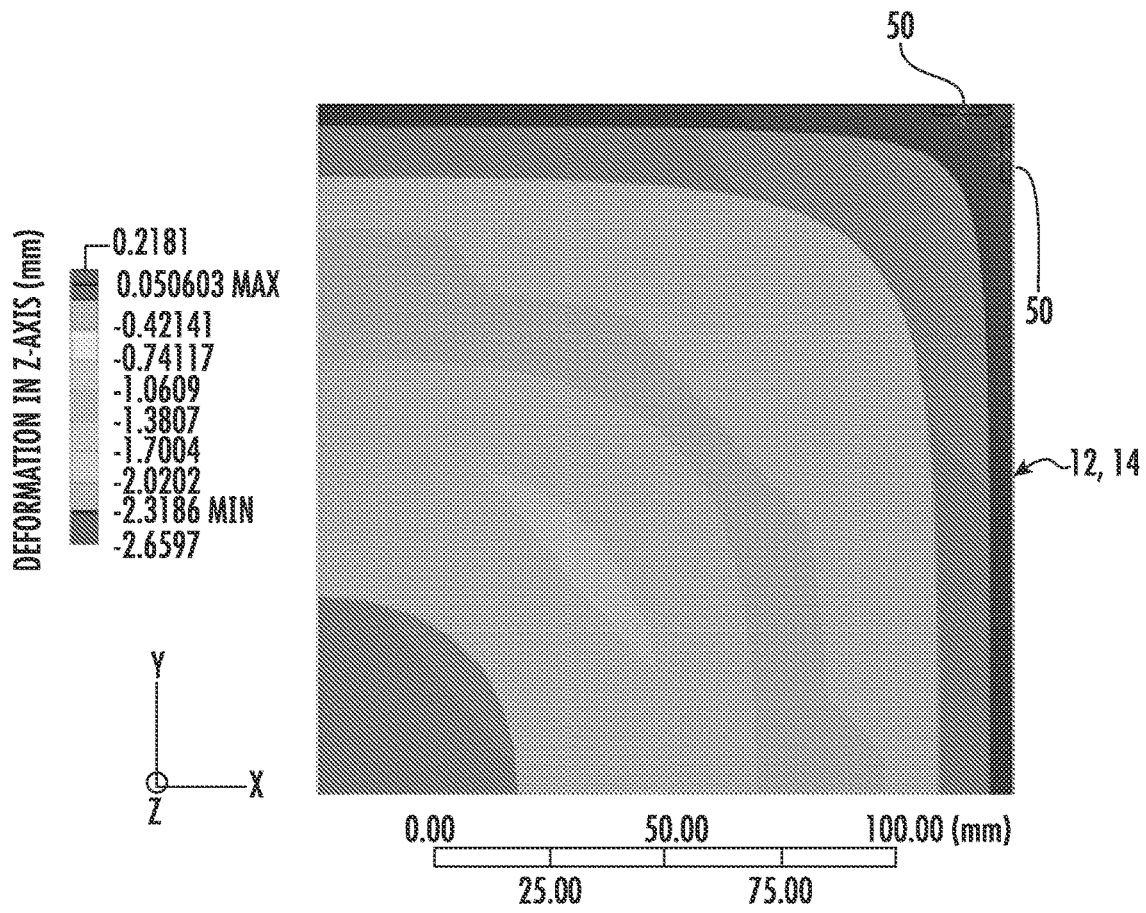
FIG. 13 is a plan view of the simulation results of FIG. 12.

In order to apply the force 36 via the clip 50, multiple clips 50 may be positioned around the perimeter of the stack of glass sheets 12 and 14. In an exemplary embodiment, two clips 50 are placed at each corner of the stack of glass sheets 12 and 14. In particular, according the plane of each sheet with an XY-coordinate plane, at each corner the two clips are arranged substantially perpendicular to each other such that one clip 50 is positioned on an edge of the glass sheets 12 and 14 substantially parallel to the X-axis and the other clip 50 is positioned on an edge of the glass sheets 12 and 14 substantially parallel to the Y-axis. Such an arrangement is depicted in FIG. 13, which will be discussed more fully below.

Figure 7:
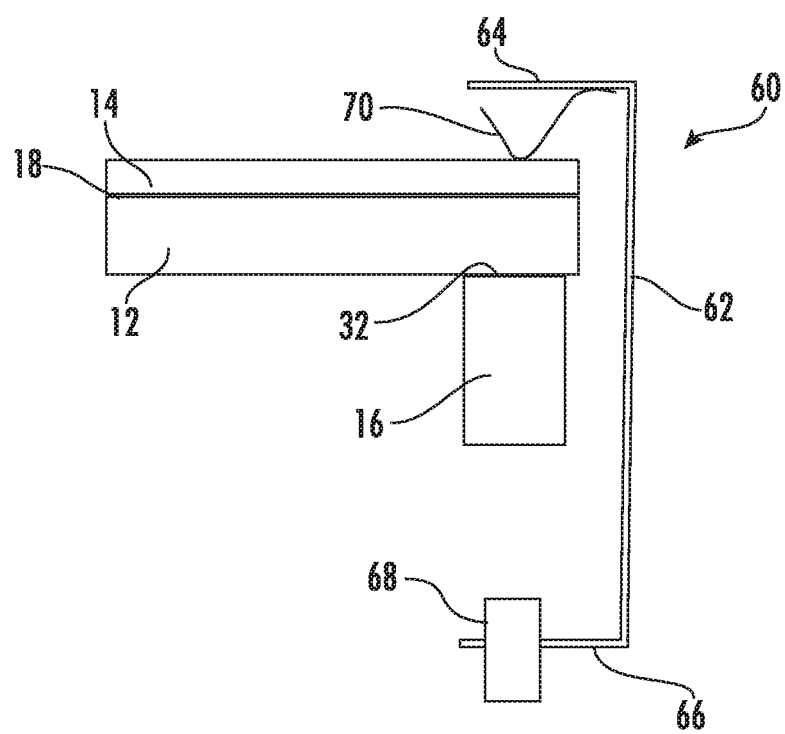
FIG. 7 is a schematic of a hanging weight system for applying a force to a stack of glass sheets, according to an exemplary embodiment.

In another embodiment shown in FIG. 7, the force 36 is applied via a hanging weight structure 60. The hanging weight structure 60 includes a suspension body 62 with an overhang projection 64 that extends over the upper glass sheet 14 and an armature 66 upon which a weight 68 is suspended. In an aspect of this embodiment, a flexible, V-shaped strip 70 is attached to the underside of the overhang protection 64 such that the bottom of the V contacts the upper surface of the upper glass sheet 14. Other shapes and/or mechanisms can be substituted for the V-shaped strip 70 for the purpose of contacting and applying the force 36 to the top surface of glass sheet 14. The weight 68 pulls downwardly on the suspension body 62 such that a clamping force 36 is applied to the glass sheets 12 and 14 along the line of contact from the V-shaped strip 70. In particular, the glass sheets 12 and 14 are clamped between the V-shaped strip 70 and the upper facing surface 32 of the bending ring 16. In embodiments, the force provided by the hanging weight structure 60 is from about 0.05 N to 1 N over 6 mm. In another embodiment, the force is 0.5 N or less over 6 mm, and in a particular embodiment, the force is 0.4 N over 6 mm. Further, in embodiments, the length of the flexible V-shaped strip 70, i.e., the length of the line of contact, is from 5 mm to 50 mm. In another embodiment, the length of the flexible V-shaped strip 70 is from 6 mm to 12 mm.

In order to apply the force 36 via the hanging weight structure 60, multiple hanging weight structures 60 can be utilized. For example, the hanging weight structures 60 can be positioned as described above with respect to the embodiments of the clip 50. Further, the hanging weight structure 60 can be formed, for example, of the same nickel-based, iron-based, or iron/nickel-based alloys as the clip 50, or just the flexible, V-shaped strip 70 can be made of the nickel-based, iron-based, or iron/nickel-based alloys. In this way, the thermal impact of the hanging weight structure(s) 60 on the glass sheets 12 and 14 is minimized.

In still another embodiment, a plurality of counterweights is arranged on the upper surface of the upper glass sheet 12. In an embodiment, the counterweights are placed at the corners of the glass sheets 12 and 14. In embodiments, the weights are from 2 lbs. to 10 lbs., and in a specific embodiment, the weights are from 5 lbs. to 7 lbs. In another embodiment, a manually-operated or automatic press lowers onto the stack of glass sheets 12 and 14 to apply pressure at the corners and/or edges of the stack of the glass sheets 12 and 14.

The force 36 as discussed in each of these previously described embodiments is applied at or near one or more of the edges of the stack of glass sheets 12 and 14 and/or at or near the one or more of the corners of the stack of glass sheets 12 and 14. In embodiments, at or near one of the corners and/or edges is within 20 mm of the edge and/or corner. In still another embodiment, at or near one of the corners and/or edges is within 10 mm of the edge and/or corner. In yet another embodiment, at or near one of the corners and/or edges is within 5 mm of the edge and/or corner.

In still other embodiments shown in FIGS. 20-24, a flexible weight 110 is used to apply a force at edge(s) and/or corner(s) or over a surface of the glass sheets 12, 14. As used herein, "flexible" refers to the ability of the weight to conform to and/or remain in contact with the surface of the glass sheets 12, 14 during forming operations.

As depicted in FIG. 20, the glass sheets 12, 14 are arranged on the bending ring 16 with the flexible weight 110 forming a ring at or near at least one of the corners and/or edges of the glass sheets 12, 14. In embodiments, at or near one of the corners and/or edges is within 20 mm of the edge and/or corner. In still another embodiment, at or near one of the corners and/or edges is within 10 mm of the edge and/or corner. In yet another embodiment, at or near one of the corners and/or edges is within 5 mm of the edge and/or corner. In embodiments, the flexible weight 110 is placed along all of the edges of the upper glass sheet 14, and in other embodiments, the flexible weighted ring 110 is only placed along certain edges of the upper glass sheet 14.

In other embodiments, the flexible weight 110 is a layer that covers a surface of the glass sheets 12, 14. For example, in an embodiment, the flexible weight 110 is a fabric that is placed over the entire surface of the glass sheets 12, 14. That is, the flexible weight 110 can be used to apply a force over the full contour of the glass sheets 12, 14. Further, in embodiments, the flexible weight 110 is used in conjunction with one or more of the clip 50, hanging weight structure 60, or the counterweights discussed above and/or in conjunction with the fluid blowing system 90 discussed below.

In embodiments, the flexible weight 110 is configured to apply a force of at least about 0.05 N to 1 N over 6 mm. In another embodiment, the flexible weight 110 is configured to apply a force of at least about 0.1 N over 6 mm. In still another embodiment, the force is 0.5 N or less over 6 mm, and in a particular embodiment, the force is 0.4 N over 6 mm. In embodiments, the flexible weight 110 is made of a material that is able to withstand typical co-sagging temperatures (e.g., 500° C. to 650° C.). In embodiments, the material is at least one of stainless steel, copper, nickel-based alloys (e.g., Inconel or Hastelloy), ceramic materials, or a silver-coated copper material. In other embodiments, the flexible weight 110 may be made of another material, and a layer of stainless sell, copper, nickel-based alloys, ceramic materials, or a silver-coated copper material is placed between the flexible weight 110 and the surface of the glass sheets 12, 14. In embodiments, the selection of the material for the flexible weight 110 or to place between the flexible weight 110 and the glass sheets 12, 14 is based on selecting a material that is non-reactive with glass and that will not stick to the glass (e.g., by melt-bonding to the glass at typical co-sagging temperatures).

Further, in embodiments wherein the flexible weight 110 is a ring, the flexible weight 110 has a round cross-section. In such embodiments, the flexible weight 110 is, for example, a cable, such as a metal wire rope (e.g., 1×19 wire bundle, 7×7 wire bundle, or 7×19 wire bundle). In another embodiment, the flexible weight 110 has a flat cross section or an elongated cross section. In such embodiments, the flexible weight 110 is, for example, a metal or ceramic braided tube, hose, or sleeve or a strip of metal fabric. In embodiments in which the flexible weight 110 is a braided metal or ceramic tube, hose, or sleeve, a weight can be inserted into the tube, hose, or sleeve, or a series of weights can be inserted along the length of the metal or ceramic tube, hose, or sleeve.

Advantageously, using a flexible weight 110 of the material described provides the benefit of avoiding the generation of optical distortions on the surface of the glass sheets 12, 14. In particular, the flexibility of the flexible weighted ring 110 avoids the formation of the optical distortions because the flexible weight 110 moves with the glass sheets 12, 14 during co-sagging.

Referring to FIG. 20, it can be seen that the bending ring 16 includes angled support surfaces 112. Prior to sagging, the lower glass sheet 12 contacts a portion of the angled support surfaces 112. During sagging, the lower glass sheet 12 bends into conformity with the angled support surfaces 112 to help define the curve, resulting in the bent glass sheets 12, 14 as shown in FIG. 21. FIG. 21 also shows that the flexible weight 110 moves with glass sheets 12, 14 during sagging, continually providing a force at or near the edges and/or corners of the glass sheets 12, 14. While not depicted, the flexible weight 110 could also be a fabric or layer that covers all or a portion of the surface of glass sheets 12, 14, and the fabric or layer would also move with the glass sheets 12, 14 during sagging to continually provide a force over the surface of the glass sheets 12, 14.

Figure 22:
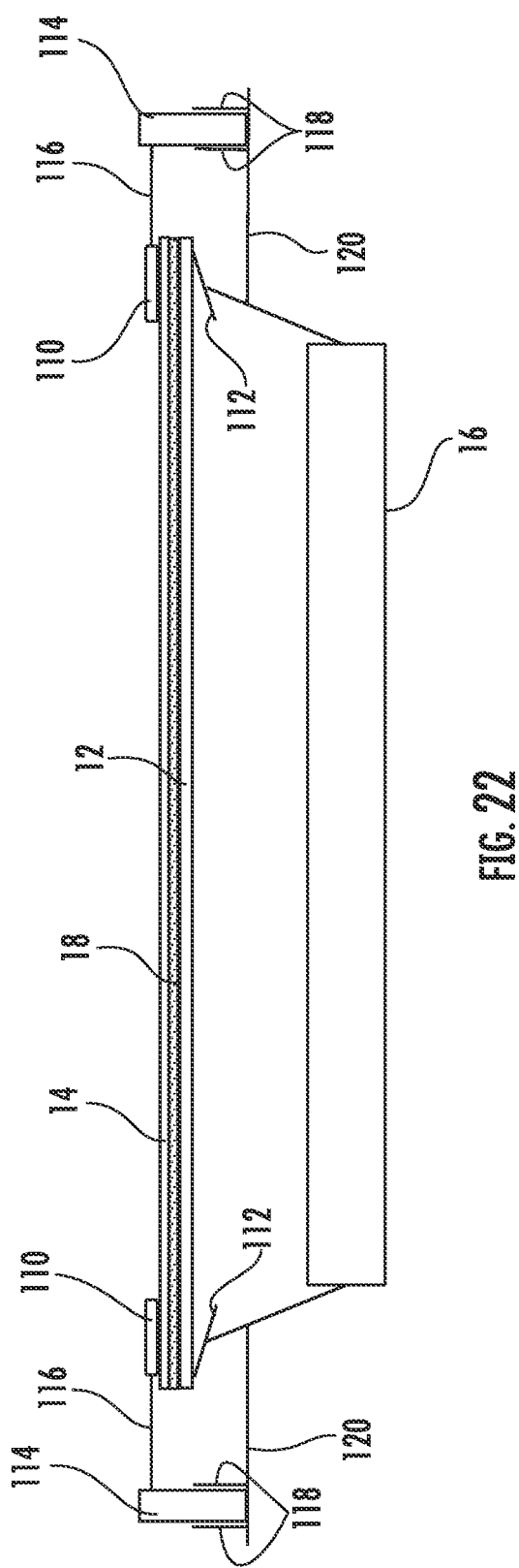
FIG. 22 depicts a mounting ring and cable system configured to secure the flexible weighted ring, according to an exemplary embodiment.

FIG. 22 provides another depiction of the flexible weight 110 in which the flexible weight 110 is connected to a mounting ring 114 via cables 116. In embodiments, the mounting ring 114 is a standalone device that is unconnected with the bending ring. In other embodiments, the mounting ring 114 is connected to the bending ring 16 as shown in FIG. 22. In the embodiment depicted, the mounting ring 114 resides in a slot defined between two wall portions 118. The two wall portions 118 extend upwardly from a peripheral ledge 120 that is connected to the bending ring 16. In embodiments, the peripheral ledge 120 and/or wall portions 118 may extend around the entire bending ring 16, and in other embodiments, the peripheral ledge 120 and/or wall portions 118 may extend only intermittently around the bending ring 16.

The cables 116 are attached at a first end to the mounting ring 114 and at a second end to the flexible weight 110. The cables 116 can be attached to the mounting ring 114 and flexible weighted ring 110 in a variety of suitable ways, including being looped around these structures, being fastened to these structures, being clipped to these structures, etc. In embodiments, the number of cables 116 may be, e.g., at least two, at least one per side of the glass sheets 12, 14, at least one per corner of the glass sheets 12, 14, the same number of cables 116 for each side of the glass sheets 12, 14, or a different number of cables 116 on at least one side of the glass sheets 12, 14. As with the flexible weight 110, the cables 116 are made of a material that is capable of withstanding typical co-sagging temperatures. Further, in embodiments, the cables 116 are attached to the flexible weight 110 and to the mounting ring 114 in such a way that the cables 116 do not come into contact with the glass sheets 12, 14 during co-sagging.

Figure 23:
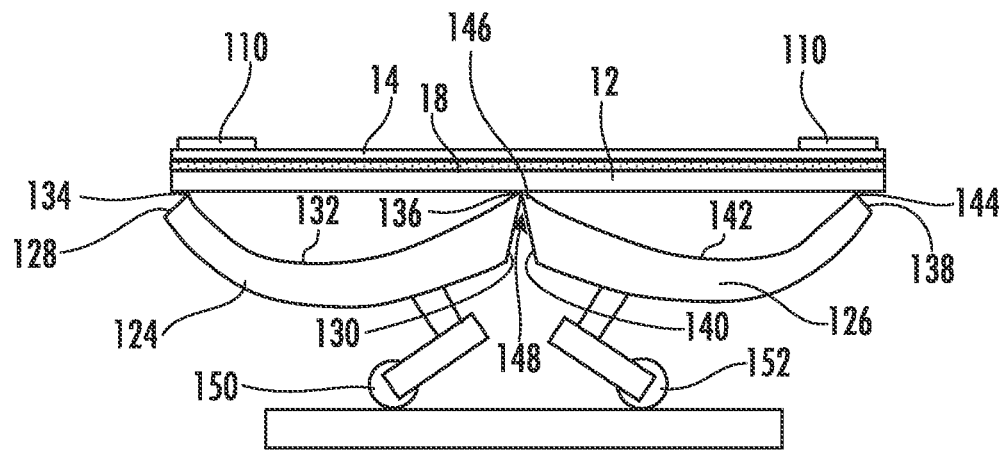
FIG. 23 depicts an articulated bending ring usable with the flexible weighted ring prior to co-sagging, according to an exemplary embodiment.
Figure 24:
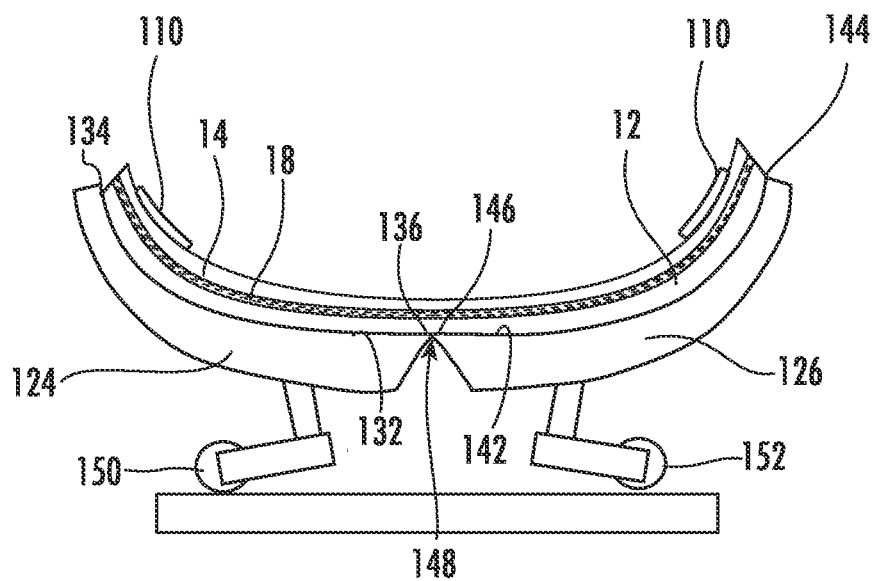
FIG. 24 depicts the articulated bending ring of FIG. 23 after the stack of glass sheets has been co-sagged, according to an exemplary embodiment.

Advantageously, as shown in FIGS. 23 and 24, the flexible weight 110 is usable with an articulated bending ring 122. Referring to FIG. 23, the articulated bending ring 122 includes a first curved support member 124 and a second curved support member 126. The first curved support member 124 is defined at least in part by a first end face 128, a second end face 130, and a first curved support surface 132 disposed therebetween. At the intersection of the first end face 128 and the first curved support surface 132 is a first corner 134, and at the intersection of the second end face 130 and the first curved support surface 132 is a second corner 136. Similarly, the second curved support member 126 is defined at least in part by a third end face 138, a fourth end face 140, and a second curved support surface 142 disposed therebetween. At the intersection of the third end face 138 and the second curved support surface 142 is a third corner 144, and at the intersection of the fourth end face 140 and the second curved support surface 142 is a fourth corner 146. As shown in FIG. 23, the stack of glass sheets 12, 14 is supported on the first corner 134 and the second corner 136 of the first curved support member 124 and on the third corner 144 and the fourth corner 146 of the second curved support member 126 at the beginning and early stages of the co-sagging process. FIG. 23 also demonstrates that the second corner 136 and the fourth corner 146 connected via a hinge joint 148. Prior to sagging, the first curved support member 124 and the second curved support member 126 form somewhat of a W shape. That is, the first curved support member 124 and the second curved support member 126 are arranged such that the first corner 134, the second corner 136, the third corner 144, and the fourth corner 146 all have the same maximum vertical position and are located in the same horizontal plane. The first curved support surface 132 decreases in vertical position and, after reaching a vertical minimum, transitions to increasing in vertical position going from the first corner 134 to the second corner 136. Similarly, the second curved support surface 142 decreases in vertical position and, after reaching a vertical minimum, transitions to increasing in vertical position going from the third corner 144 to the fourth corner 146. Thus, going from left to right in FIG. 23, the articulated bending ring 122 begins at a first vertical maximum at first corner 134, goes to a vertical minimum at a point along the first curved support surface 132, reaches a second vertical maximum at the second corner 136 and fourth corner 146, goes to a second vertical minimum at a point along the second curved support surface 142, and reaches a third vertical maximum at the third corner 144, which is similar to the shape of a W.

The first curved support member 124 is supported on a first roller 150, and the second curved support member 126 is supported on a second roller 152. As the glass sheets 12, 14 begin to sag, the weight of the glass sheets 12, 14 over the first curved support surface 132 and the second curved support surface 126 cause second corner 136 and the fourth corner 146 to drop down. Because of the hinged connection between these corners 136, 146, which prevents the corners 136, 146 from separating, the rollers 150, 152 instead move apart, causing the first corner 134 and the third corner 144 to move upwardly (or in the opposite direction of the second corner 136 and the fourth corner 146). By the end of the sagging process as shown in FIG. 24, the first curved support surface 132 and the second curved support surface 142 define a continuous curve such that the first curved support member 124 and the second curved support member 126 transition from the W shape to a U shape in which (going from left to right in FIG. 23) the first corner 134 and the third corner 134 are at vertical maximums, the second corner 136 and the fourth corner 146 are at vertical minimums, the first curved support surface 132 transitions from the vertical maximum at the first corner 134 to the vertical minimum, and the second curved support surface 142 transitions from the vertical minimum to the vertical maximum at the third corner 144. In making this transition, the flexible weight 110 is able to remain in contact with the surface of the upper glass sheet 14, preventing air pockets from forming between the glass sheets 12, 14.

Figure 18:
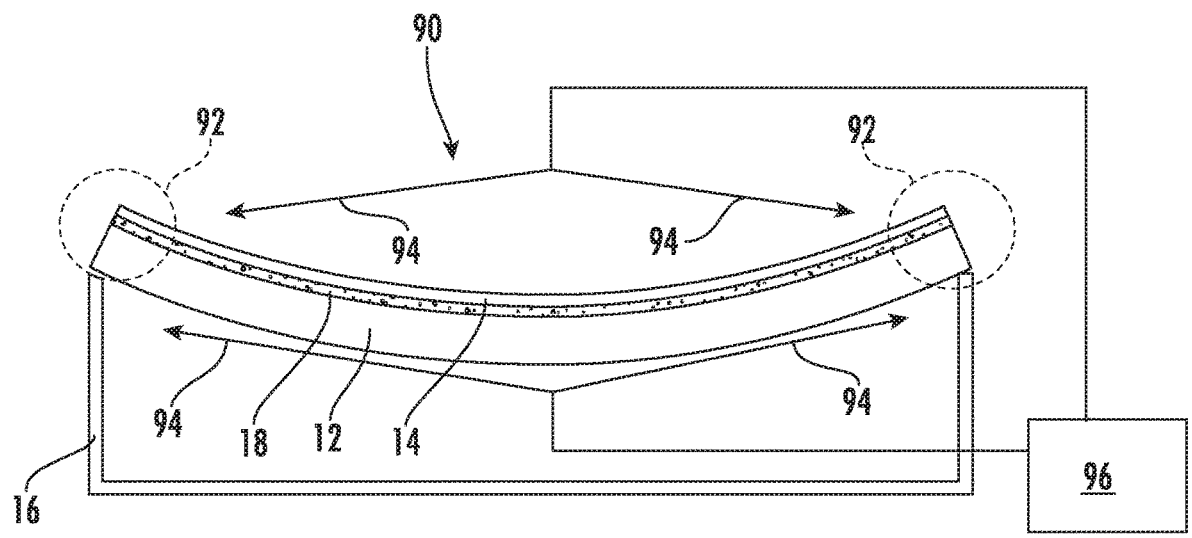
FIG. 18 depicts a side view of a fluid blowing system for controlling the flow of fluid between two glass sheets during a co-sagging process, according to an exemplary embodiment.

Referring now to the embodiment of controlling the flow of fluid between the glass sheets 12 and 14 via creation of low pressure regions at the edges and/or corners of the glass sheets 12 and 14, a fluid blowing system 90 is depicted in FIG. 18. The fluid blowing system 90 creates low pressure regions 92 at the edges and/or corners of the glass sheets 12 and 14 by directing high pressure fluid (denoted by arrows 94) to the edge and/or corner regions. As can be seen in FIG. 18, the fluid blowing system 90 can provide high pressure fluid 94 both from above the upper glass sheet 14 and from below the lower glass sheet 12. Alternatively, the fluid blowing system 90 can provide high pressure fluid 94 from just one of above the upper glass sheet 14 or below the lower glass sheet 12. As can also be seen in FIG. 18, the fluid blowing system 90 is fed from a single fluid supply tank 96; however, the upper and lower portions of the fluid blowing system 90 can be fed by different fluid supply tanks 96 in other embodiments. Further, multiple nozzles can be used to supply the high pressure fluid 94 to the edges and/or corners. For example, a nozzle can be provided at each corner on one or both sides of the glass sheets 12 and 14. Furthermore, the direction that the high pressure fluid 94 is made to flow can be varied. In embodiments, the high pressure fluid 94 is directed substantially parallel to the nearest edge surface of the glass sheets 12 and 14. In another embodiment, the high pressure fluid 94 is made to flow in a direction substantially parallel to the surface of one or both of the glass sheets 12 and 14.

Figure 19:
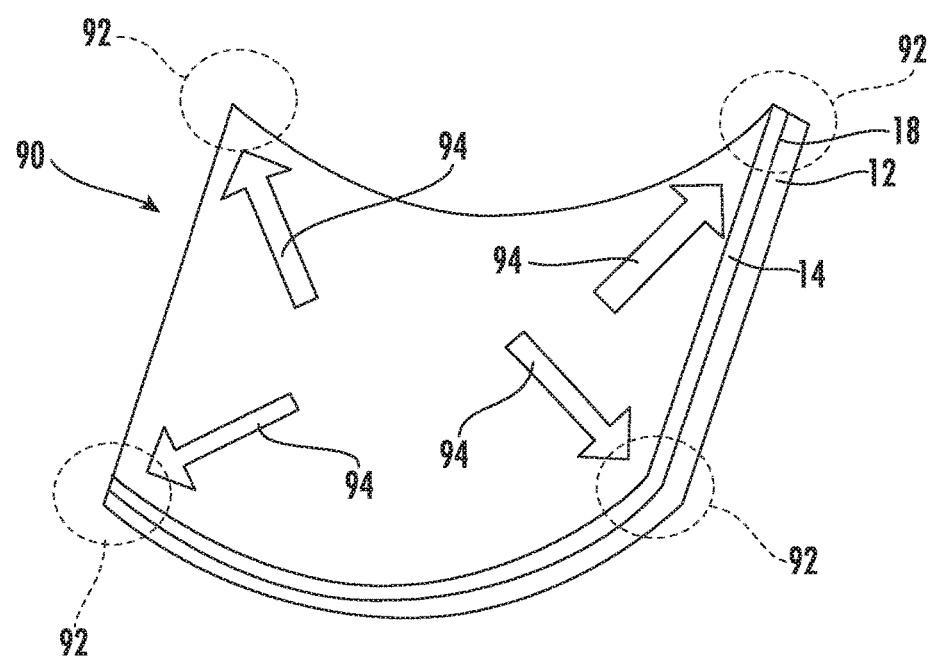
FIG. 19 depicts a perspective view of a fluid blowing system for controlling the flow of fluid between two glass sheets during a co-sagging process, according to an exemplary embodiment.

Additionally, as can be seen in FIG. 19, the fluid blowing system 90 can direct the high pressure fluid 94 to the corners of the stack of glass sheets 12 and 14. Such high pressure fluid 94 can also be made to flow into the corners in a manner that is substantially parallel to the upper surface of the upper glass sheet 14 and/or substantially parallel to the lower surface of the lower glass sheet 12. In particular, the fluid blowing system 90 is used throughout the co-sagging process in certain embodiments. However, in other embodiments, the fluid blowing system 90 can be activated during only certain stages of the co-sagging process, such as when deformation transitions from elastic to viscous flow where edge-lifting and loss of suction may be more likely to occur.

The fluid used in the fluid blowing system 90 can be any fluid that is non-reactive with the glass materials at the co-sagging process temperatures. In an embodiment, the fluid is air. In another embodiment, the fluid is a relatively inert or noble gas or a mixture of such gases. Exemplary fluids for use in the fluid supply system include carbon dioxide, nitrogen, helium, argon, neon, and the like.

The fluid blowing system 90 as described herein helps to maintain the suction between the glass sheets 12 and 14. Without wishing to be bound by theory, Applicant believes that, in accordance with Bernoulli's principle, the fluid blowing system 90 creates low pressure regions 92 at the corners and/or edges of the glass sheets 12 and 14 where edge-lifting is most prevalent. The lower pressure at the corners seals the corners from the inrush of fluid that might otherwise occur. In this way, suction between the glass sheets 12 and 14 is maintained such that the shape mismatch between the glass sheets 12 and 14 is reduced. The location, blowing direction, and blowing force of the fluid blowing system 90 can be arranged in various ways to create such low pressure regions 92 at the desired locations of the glass sheets 12 and 14.

Figure 8:
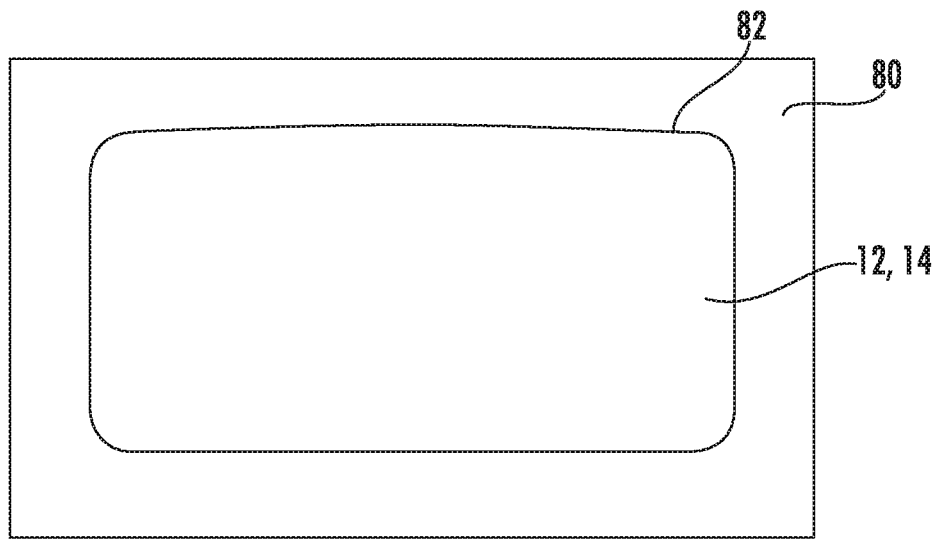
FIG. 8 is a plan view of a glass preform cut from a glass sheet used to form the stacked glass sheets of FIG. 2, according to an exemplary embodiment.

For completeness, additional steps for forming a glass laminate article before and after the co-sagging process are provided. Referring to FIG. 8, by way of example, glass sheet 12 or 14 (also referred to as a preform) are cut from their individual stock glass sheets 80. The shape of the perimeter 82 is defined by a flat pattern as needed to produce the desired shape following co-sagging. After glass sheets 12 and 14 are cut from the stock glass sheet, the edges may be ground to break the sharp corners. Following this process, glass sheets 12 and 14 are stacked and co-sagged as explained above regarding FIGS. 1-4.

In various embodiments, a curved glass laminate article formed from the process and/or system discussed herein is provided. In specific embodiments, the curved glass laminate article includes sheets 12 and 14 bound together by an interlayer (e.g., a polymer interlayer such as a polyvinyl butyral layer). In such embodiments, the glass laminate article formed from glass sheets 12 and 14 is highly asymmetrical (e.g., has the large thickness differences and/or material property differences discussed above) while at the same time having low levels of shape difference between the layers.

Figure 9:
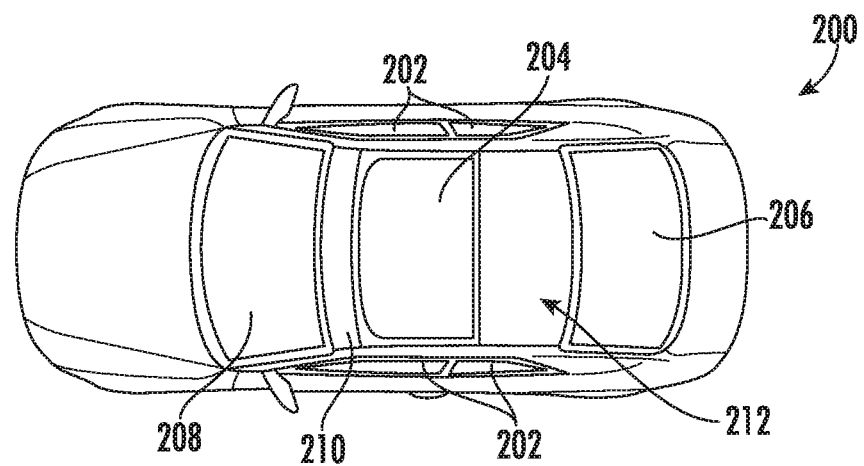
FIG. 9 is a plan view of a vehicle having several glass windows which could be formed of a laminate article produced from co-sagging glass sheets according to an exemplary embodiment.

Referring to FIG. 9, use of glass laminate article made from the glass sheets 12 and 14 as part of a vehicle window, roof or side window, is shown. As shown, a vehicle 200 includes one or more side windows 202, a roof 204, a back window 206 and/or a windshield 208. In general, any of the embodiments of glass laminate article discussed herein may be used for one or more side windows 202, a roof 204, a back window 206 and/or a windshield 208. In general, one or more side windows 202, a roof 204, a back window 206 and/or a windshield 208 are supported within an opening defined by vehicle frame or body 210 such that outer surface of glass layer 12 faces a vehicle interior 212. In this arrangement, outer surface of glass layer 14 faces toward the exterior of vehicle 200 and may define the outermost surface of vehicle 200 at the location of the glass article. As used herein, vehicle includes automobiles, rolling stock, locomotive, boats, ships, airplanes, helicopters, drones, space craft and the like. In other embodiments, glass laminate article may be used in a variety of other applications where thin, curved glass laminate articles may be advantageous, such as for architectural glass, building glass, etc.

Glass sheets 12 and/or 14 can be formed from a variety of materials. In specific embodiments, glass sheet 14 is formed from a chemically strengthened alkali aluminosilicate glass composition or an alkali aluminoborosilicate glass composition, and glass sheet 12 is formed from a soda lime glass (SLG) composition. In specific embodiments, glass sheets 12 and/or 14 are formed from a chemically strengthened material, such as an alkali aluminosilicate glass material or an alkali aluminoborosilicate glass composition, having a chemically strengthened compression layer having a depth of compression (DOC) in a range from about 30 μm to about 90 μm, and a compressive stress on at least one of the sheet's major surfaces of between 300 MPa to 1000 MPa. In some embodiments, the chemically strengthened glass is strengthened through ion exchange.

Examples of Glass Materials and Properties

In various embodiments, glass sheets 12 and/or 14 may be formed from any of a variety of strengthened glass compositions. Examples of glasses that may be used for glass sheets 12 and/or 14 described herein may include alkali aluminosilicate glass compositions or alkali aluminoborosilicate glass compositions, though other glass compositions are contemplated. Such glass compositions may be characterized as ion exchangeable. As used herein, "ion exchangeable" means that the layer comprising the composition is capable of exchanging cations located at or near the surface of the glass layer with cations of the same valence that are either larger or smaller in size. In one exemplary embodiment, the glass composition of glass sheets 12 and/or 14 comprises $SiO_2$, $B_2O_3$ and $Na_2O$, where $(SiO_2+B_2O_3) \geq 66$ mol. %, and $Na_2O \geq 9$ mol. %. Suitable glass compositions for glass sheets 12 and/or 14, in some embodiments, further comprise at least one of $K_2O$, MgO, and CaO. In a particular embodiment, the glass compositions used in glass sheets 12 and/or 14 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example of glass composition suitable for glass sheets 12 and/or 14 comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

Even further, another example of glass composition suitable for glass sheets 12 and/or 14 comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass composition suitable for glass sheets 12 and/or 14 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma \text{modifiers})>1$, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma \text{modifiers})>1$.

In still another embodiment, glass sheets 12 and/or 14 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O+K_2O+B_2O_3$+MgO+CaO+SrO>10 mol. %; 5 mol. %≤MgO+CaO+SrO≤8 mol. %; $(Na_2O+B_2O_3)-Al_2O_3 \leq 2$ mol. %; 2 mol. % $Na_2O-Al_2O_3 \leq 6$ mol. %; and 4 mol. %≤$(Na_2O+K_2O)-Al_2O_3 \leq 10$ mol. %.

In an alternative embodiment, glass sheets 12 and/or 14 may comprise an alkali aluminosilicate glass composition comprising: 2 mol % or more of $Al_2O_3$ and/or $ZrO_2$, or 4 mol % or more of $Al_2O_3$ and/or $ZrO_2$. In one or more embodiments, glass sheets 12 and/or 14 comprise a glass composition comprising $SiO_2$ in an amount in the range from about 67 mol % to about 80 mol %, $Al_2O_3$ in an amount in a range from about 5 mol % to about 11 mol %, an amount of alkali metal oxides ($R_2O$) in an amount greater than about 5 mol % (e.g., in a range from about 5 mol % to about 27 mol %). In one or more embodiments, the amount of $R_2O$ comprises $Li_2O$ in an amount in a range from about 0.25 mol % to about 4 mol %, and $K_2O$ in an amount equal to or less than 3 mol %. In one or more embodiments, the glass composition includes a non-zero amount of MgO, and a non-zero amount of ZnO.

In other embodiments, glass sheets 12 and/or 14 are formed from a composition that exhibits $SiO_2$ in an amount in the range from about 67 mol % to about 80 mol %, $Al_2O_3$ in an amount in the range from about 5 mol % to about 11 mol %, an amount of alkali metal oxides ($R_2O$) in an amount greater than about 5 mol % (e.g., in a range from about 5 mol % to about 27 mol %), wherein the glass composition is substantially free of $Li_2O$, and a non-zero amount of MgO; and a non-zero amount of ZnO.

In other embodiments, glass sheets 12 and/or 14 are an aluminosilicate glass article comprising: a glass composition comprising $SiO_2$ in an amount of about 67 mol % or greater; and a sag temperature in a range from about 600° C. to about 710° C. In other embodiments, glass sheets 12 and/or 14 are formed from an aluminosilicate glass article comprising: a glass composition comprising $SiO_2$ in an amount of about 68 mol % or greater; and a sag temperature in a range from about 600° C. to about 710° C. (as defined herein).

In some embodiments, glass sheets 12 and/or 14 are formed from different glass materials from each other that differs in any one or more of composition, thickness, strengthening level, and forming method (e.g., float formed as opposed to fusion formed). In one or more embodiments, glass sheets 12 and/or 14 described herein have a sag temperature of about 710° C., or less or about 700° C. or less. In one or more embodiments, one of the glass sheets 12 and 14 is a soda lime glass sheet, and the other of the glass sheets 12 and 14 is any one of the non-soda lime glass materials discussed herein. In one or more embodiments, glass sheets 12 and/or 14 comprises a glass composition comprising $SiO_2$ in an amount in the range from about 68 mol % to about 80 mol %, $Al_2O_3$ in an amount in a range from about 7 mol % to about 15 mol %, $B_2O_3$ in an amount in a range from about 0.9 mol % to about 15 mol %; a non-zero amount of $P_2O_5$ up to and including about 7.5 mol %, $Li_2O$ in an amount in a range from about 0.5 mol % to about 12 mol %, and $Na_2O$ in an amount in a range from about 6 mol % to about 15 mol %.

In some embodiments, the glass composition of glass sheets 12 and/or 14 may include an oxide that imparts a color or tint to the glass articles. In some embodiments, the glass composition of glass sheets 12 and/or 14 includes an oxide that prevents discoloration of the glass article when the glass article is exposed to ultraviolet radiation. Examples of such oxides include, without limitation, oxides of: Ti, V, Cr, Mn, Fe, Co, Ni, Cu, Ce, W, and Mo.

Glass sheets 12 and/or 14 may have a refractive index in the range from about 1.45 to about 1.55. As used herein, the refractive index values are with respect to a wavelength of 550 nm. Glass sheets 12 and/or 14 may be characterized by the manner in which it is formed. For instance, glass sheets 12 and/or 14 may be characterized as float-formable (i.e., formed by a float process), down-drawable and, in particular, fusion-formable or slot-drawable (i.e., formed by a down draw process such as a fusion draw process or a slot draw process). In one or more embodiments, glass sheets 12 and/or 14 described herein may exhibit an amorphous microstructure and may be substantially free of crystals or crystallites. In other words, in such embodiments, the glass articles exclude glass-ceramic materials.

In one or more embodiments, glass sheets 12 and/or 14 exhibits an average total solar transmittance of about 88% or less, over a wavelength range from about 300 nm to about 2500 nm, when glass sheets 12 and/or 14 has a thickness of 0.7 mm. For example, glass sheets 12 and/or 14 exhibits an average total solar transmittance in a range from about 60% to about 88%, from about 62% to about 88%, from about 64% to about 88%, from about 65% to about 88%, from about 66% to about 88%, from about 68% to about 88%, from about 70% to about 88%, from about 72% to about 88%, from about 60% to about 86%, from about 60% to about 85%, from about 60% to about 84%, from about 60% to about 82%, from about 60% to about 80%, from about 60% to about 78%, from about 60% to about 76%, from about 60% to about 75%, from about 60% to about 74%, or from about 60% to about 72%.

In one or more embodiments, glass sheets 12 and/or 14 exhibit an average transmittance in the range from about 75% to about 85%, at a thickness of 0.7 mm or 1 mm, over a wavelength range from about 380 nm to about 780 nm. In some embodiments, the average transmittance at this thickness and over this wavelength range may be in a range from about 75% to about 84%, from about 75% to about 83%, from about 75% to about 82%, from about 75% to about 81%, from about 75% to about 80%, from about 76% to about 85%, from about 77% to about 85%, from about 78% to about 85%, from about 79% to about 85%, or from about 80% to about 85%. In one or more embodiments, glass sheets 12 and/or 14 exhibits $T_{uv-380}$ or $T_{uv-400}$ of 50% or less (e.g., 49% or less, 48% or less, 45% or less, 40% or less, 30% or less, 25% or less, 23% or less, 20% or less, or 15% or less), at a thickness of 0.7 mm or 1 mm, over a wavelength range from about 300 nm to about 400 nm.

In one or more embodiments, glass sheets 12 and/or 14 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments, glass sheets 12 and/or 14 may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature below the glass transition point and then rapidly quenching.

In one or more embodiments, glass sheets 12 and/or 14 may be chemically strengthening by ion exchange. In the ion exchange process, ions at or near the surface of glass sheets 12 and/or 14 are replaced by—or exchanged with—larger ions having the same valence or oxidation state. In those embodiments in which glass sheets 12 and/or 14 comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$, or the like. In such embodiments, the monovalent ions (or cations) exchanged into glass sheets 12 and/or 14 generate a stress.

Experimental Examples

Applicant has conducted a number of simulations and experiments to understand and evaluate shape mismatch during co-sagging of high asymmetry glass pairs as discussed herein.

During the experimental co-sagging process, two plates of glass of different composition (and consequently different viscosities) were initially stacked together with a layer of separation powder between them. For the experiments, the thicker, lower sheet of glass was soda lime glass (SLG), and the thinner, upper sheet is alkali aluminosilicate glass (GG), in particular Gorilla Glass 2318 (available from Corning Incorporated, Corning, N.Y.). The size of the separation powder particles was measured to be in the range of 10 μm to 20 μm, and thus, for the analyses performed, the initial gap between the two glass sheets was assumed to be 10 μm to 20 μm. Pressure P in the gap between two glasses sheets is governed by Equation 1 below:

$$\frac{\partial h}{\partial t} = \nabla \left( \frac{h^3}{12\mu} \nabla P \right) \quad (1)$$

where, h is the gap between glass sheets as a function of time t and μ is the air viscosity. This equation relates pressure to gap opening and, generally, is valid as long as the gap, h, is small. As long as the glass sheets are in an elastic state, there is no gap change between the two glasses. At forming temperatures when the viscosity of bottom SLG decreases to a point that it will tend to sag away from harder GG at the top. However, for separation of the glass sheets to occur, air must enter between glass sheets, which typically happens from the edges.

Figure 10:
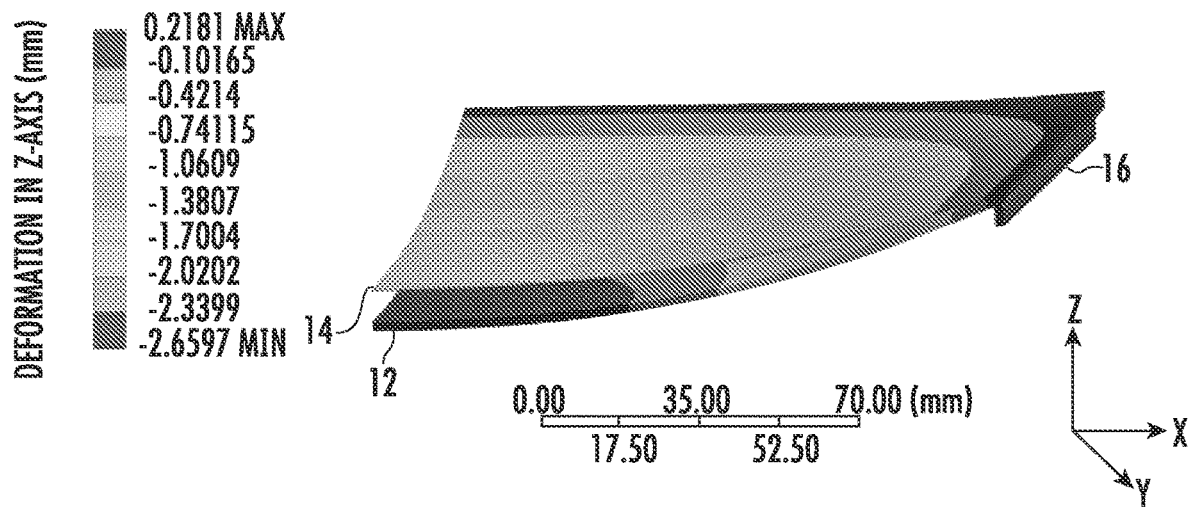
FIG. 10 is a simulation result for shape mismatch between two glass sheets without a force applied at the edge/corner.
Figure 11:
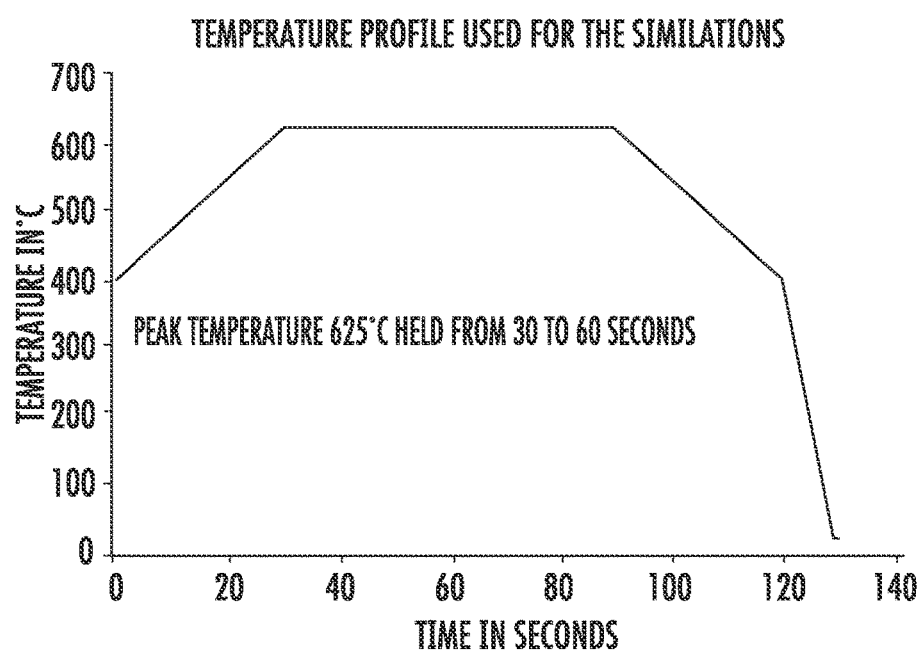
FIG. 11 is a temperature profile for the co-sagging simulation for which results are depicted in FIGS. 10 and 12-15.

Using computer analysis, the separation between SLG and GG glass sheets, both without and with force applied to the edges and/or corners, was simulated. The simulation result for a quarter of the two stacked glass sheets 12 and 14 without clamping force is shown in FIG. 10. In particular, for the simulation, the lower glass sheet 12 was 2.1 mm SLG, and the upper glass sheet 14 was 0.55 mm GG. Both glass sheets were 300 mm square. The separation between the glass sheets 12 and 14 was set at 25 μm and was not allowed to decrease to less than 15 μm. Further, as can be seen in FIG. 10, the glass sheets 12 and 14 are resting on the bending ring 16, which for the purpose of simulation was 2 mm thick and 298 mm from edge-to-edge in the X and Y directions. For the simulation, the stacked glass sheets 12 and 14 were heated from 400° C. to 625° C. over 30 seconds, held for 60 seconds at that temperature, and then cooled back to 400° C. over 30 seconds. The temperature profile for the heating of the glass sheets 12 and 14 is shown in FIG. 11. During the simulation, the glass sheets 12 and 14 were allowed to sag under the force of gravity.

Based on the color gradient in the legend, the edge and corner regions of the glass sheets 12 and 14 lift upwardly after treatment. Further, from the color gradient in the legend, the centers of the glass sheets 12 and 14 both sag downwardly, but at different amounts. In particular, the lower SLG glass sheet 12 sags more than 0.6 mm lower than the upper GG glass sheet 14. Specifically, the glass sheets 12 and 14 were separated by 0.675 mm at the centers of the plates after 129 seconds. Without the effect of the air film (i.e., the suction effect provided by the air pressure in the separation between the sheets 12 and 14), the separation would have been much greater, 15.168 mm, as found in a separate simulation, indicating how much difference in viscosity and thickness can create shape mismatch between glass sheets 12 and 14. Even the small mismatch of more than 0.6 mm can be too large for certain applications, e.g., automotive windshields.

Figure 12:
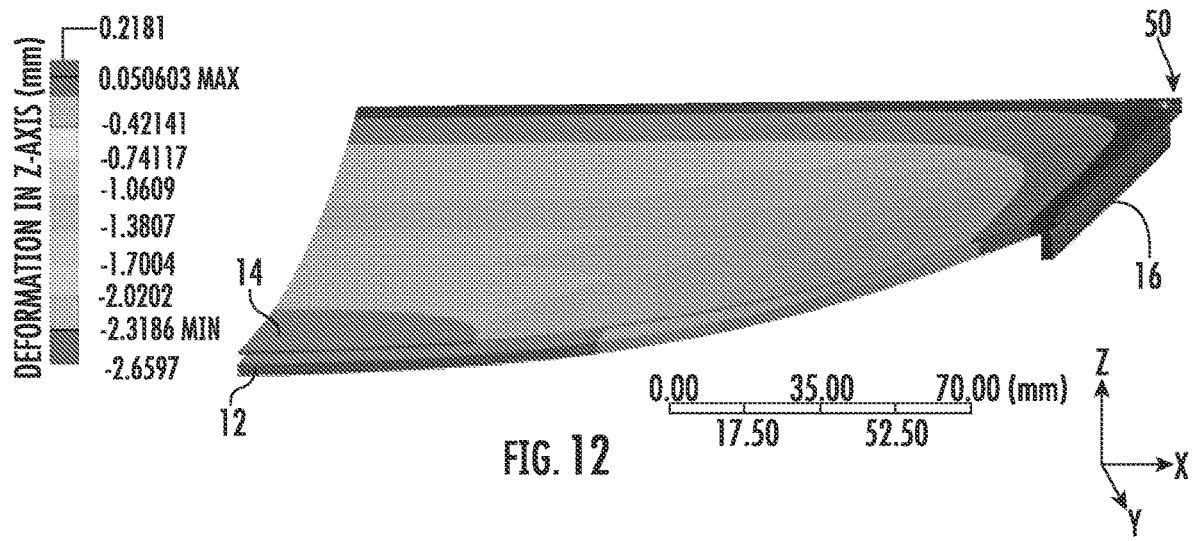
FIG. 12 is a simulation result for shape mismatch between two glass sheets that have been clipped together during a simulated co-sagging process, according to an exemplary embodiment.

In FIGS. 12 and 13, the same simulation was performed with the exception that the simulation included two clips 50 at each corner of the stack of the glass sheets 12 and 14. For the simulation, the clip 50 provided a clamping force of 0.4 N over a length of 6 mm. The clips 50 were 12 mm long and 2 mm wide. As can be seen in FIGS. 12 and 13, the shape mismatch between the glass sheets 12 and 14 was much less than in the unclipped embodiment of FIG. 11. In particular, the shape mismatch was 0.164 mm.

By comparing FIG. 10 to FIGS. 12 and 13, a source of the separation can be determined. Specifically, the corner of the glass sheets 12 and 14 in FIG. 10 exhibits much greater edge/corner lift than the corner of FIGS. 12 and 13. This separation is driven by mechanical forces related to the bending of the sheets in the corner (considering the differences in sagging between the sheets as shown in FIGS. 16 and 17). The upper glass sheet 14 bends to a lesser extent as a result of its higher viscosity, and a gap opens in the corner. This gap allows air to enter between the glass sheets 12 and 14, reducing the effect of pressure between the plates.

Figure 14:
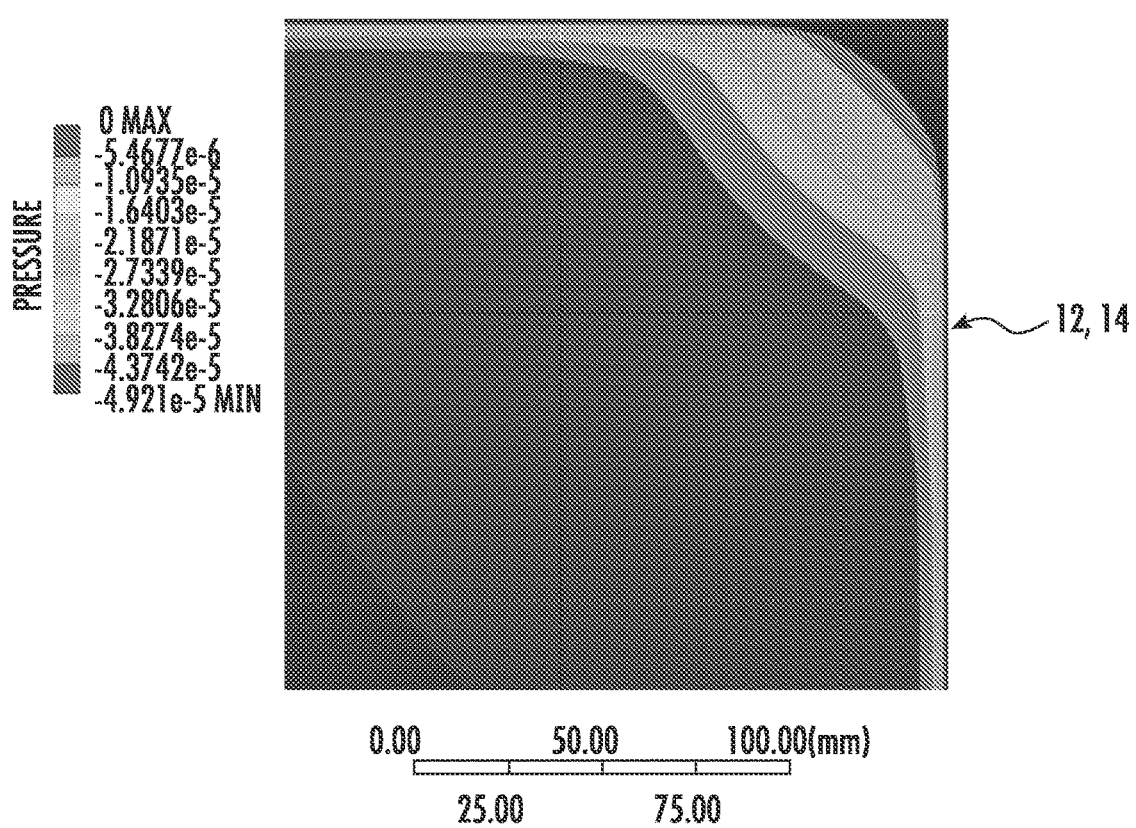
FIG. 14 is a simulation result for the pressure between stacked glass sheets for which no force was applied at the edge/corner during co-sagging.
Figure 15:
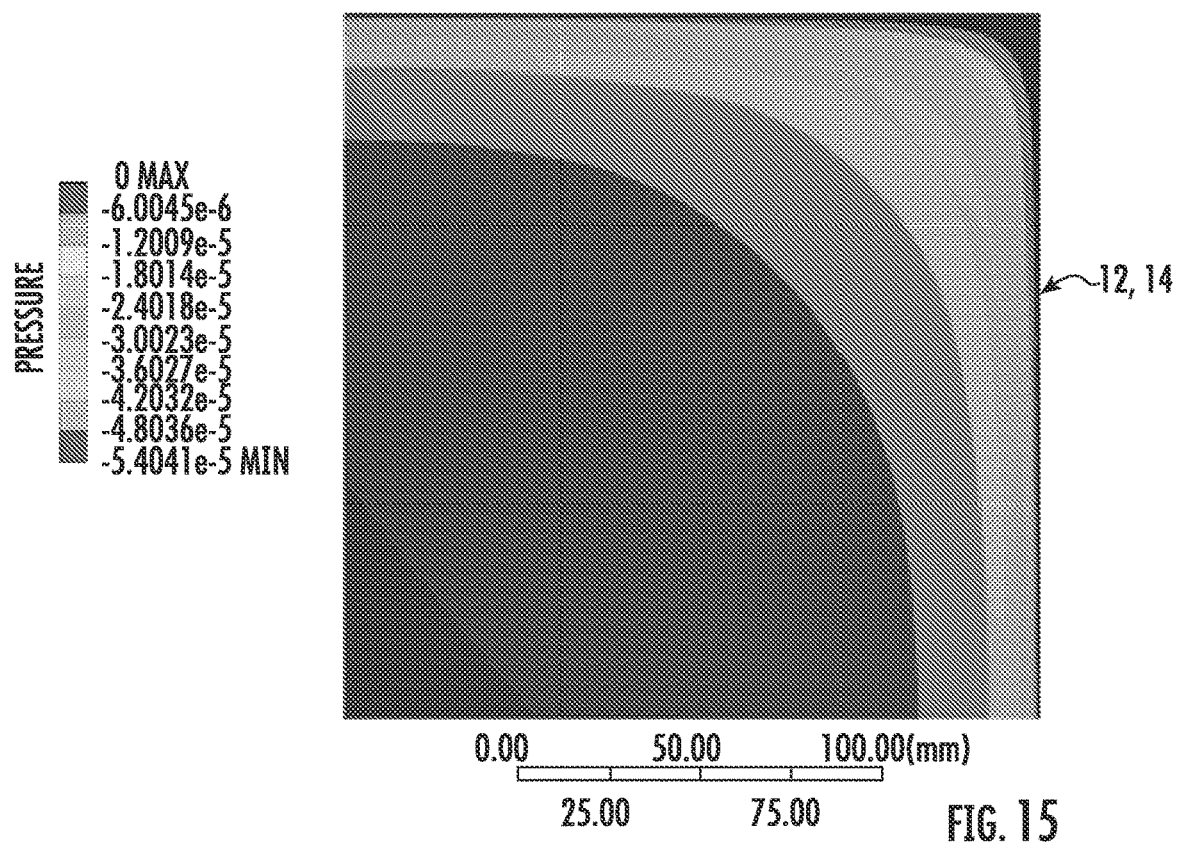
FIG. 15 is a simulation result for the pressure between stacked glass sheets for which clips were used to apply a force at the corners during co-sagging, according to an exemplary embodiment.

FIGS. 14 and 15 depict the pressure between the glass sheets 12 and 14. FIG. 14 corresponds to the glass sheets 12 and 14 of FIG. 10 (i.e., no force 36 applied at the edges and/or corners), whereas FIG. 15 corresponds to the glass sheets 12 and 14 of FIGS. 12 and 13 in which two clips 50 were attached at each corner. In FIG. 14, the region of no suction (red color) is much larger than the region of no suction in FIG. 15. Further, the clipped glass sheets 12 and 14 of FIG. 15 exhibited a greater suction pressure than the unclipped glass sheets 12 and 14 of FIG. 14.

Further experimentation was performed in a static furnace with a 2.1 mm thick lower SLG sheet and 0.7 mm thick upper GG sheet. A baseline experiment was performed in which no clips or weights were positioned at the edges or corners of the glass sheets 12 and 14. Thereafter, a force 36 was applied to the glass sheets 12 and 14 via a clip 50. Table 1 compares the shape mismatch in sag depths for the two scenarios. A lower shape mismatch is observed in the latter case in which clips 50 were used, indicating the effectiveness of closing the gap created at the corners during bending.

TABLE 1

Mismatch between SLG and GG during first co-sagging trial

| Experiment | Top glass | Bottom glass | Top and bottom glass shape mismatch |
|---|---|---|---|
| No clips | 0.7 mm GG | 2.1 mm SLG | 3.3 mm |
| Clipped at corners | 0.7 mm GG | 2.1 mm SLG | 1.7 mm |

In another experiment, a baseline experiment was performed in which no force was applied at the edges or corners of the glass sheets 12 and 14. Thereafter, an experiment was performed in which a counterweight was placed at the corners of the glass sheets 12 and 14. Table 2 compares the measured shape mismatch between the two scenarios. Again, a lower mismatch is achieved when using counterweights.

TABLE 2

Mismatch between SLG and GG during second co-sagging trial

| Experiment | Top glass | Bottom glass | Top and bottom glass shape mismatch |
|---|---|---|---|
| No Counterweights | 0.7 mm GG | 2.1 mm SLG | 1.8 mm |
| Counterweights at corners | 0.7 mm GG | 2.1 mm SLG | 0.9 mm |

Aspect 1 of this disclosure pertains to a process for co-forming a stack of glass sheets to have similar curvatures, the process comprising: placing a first sheet of glass material on a support surface of a shaping frame, the shaping frame defining an open central cavity surrounded at least in part by the support surface; placing a second sheet of glass material over the first sheet of glass material, wherein the first sheet of glass material and the second sheet of glass material are both supported by the shaping frame; heating the first sheet of glass material and the second sheet of glass material together while supported by the shaping frame such that central regions of the first and second sheets of glass material deform downward into the open central cavity of the shaping frame; and during at least a portion of the heating, controlling a flow of fluid in a space between the first sheet of glass material and the second sheet of glass material at or near one or more of the edges and/or corners of the first and second sheets of glass material, wherein the first sheet of glass material comprises a first outer surface and a first inner surface opposite the first outer surface, and the second sheet of glass material comprises a second outer surface and a second inner surface opposite the second outer surface, the first inner surface facing the second inner surface when the first sheet of glass material and the second sheet of glass material are both supported by the shaping frame.

Aspect 2 of this disclosure pertains to the process of Aspect 1, wherein the controlling the flow of the fluid into the space comprises minimizing separation of the first sheet of glass material and the second sheet of glass material at or near one or more of the edges and/or corners.

Aspect 3 of this disclosure pertains to the process of Aspect 1 or Aspect 2, wherein the controlling the flow of the fluid into the space comprises creating a low pressure region at or near one or more of the edges and/or corners of the first and second sheets of glass material.

Aspect 4 of this disclosure pertains to the process of Aspect 3, wherein controlling the flow of fluid into the space comprises flowing a fluid under pressure at or near one or more of the edges and/or corners of the first and second sheets of glass material to create the low pressure region.

Aspect 5 of this disclosure pertains to the process of Aspect 4, wherein the fluid that is flowing under pressure is flowing in a direction substantially parallel to a nearest edge of the first and second sheets of glass material.

Aspect 6 of this disclosure pertains to the process of Aspect 4, wherein the fluid that is flowing under pressure is flowing in a direction substantially parallel to a surface of the first sheet of glass material or to a surface of the second sheet of glass material.

Aspect 7 of this disclosure pertains to the process of any of Aspects 4 to 6, wherein the fluid that is flowing under pressure is flowing substantially parallel to at least a portion of the first or second outer surface towards one or more of the edges and/or corners of the first sheet of glass material or the second sheet of glass material.

Aspect 8 of this disclosure pertains to the process of Aspect 1 or Aspect 2, wherein controlling the flow of the fluid into the space comprises applying a force at or near one or more of the edges and/or corners or over a surface of the first sheet of glass material and of the second sheet of glass material.

Aspect 9 of this disclosure pertains to the process of Aspect 8, wherein the direction of the force is substantially perpendicular to the second outer surface of the second sheet of glass material.

Aspect 10 of this disclosure pertains to the process of Aspect 8, wherein the force is from 0.1 N to 1 N Aspect 11 of this disclosure pertains to the process of Aspect 10, wherein the force is less than 0.5 N.

Aspect 12 of this disclosure pertains to the process of any of Aspects 7 to 11, wherein the force is applied over a distance of 6 mm.

Aspect 13 of this disclosure pertains to the process of any of Aspects 7 to 12, wherein the force is applied within 20 mm of an edge of the first and second sheets of glass material.

Aspect 14 of this disclosure pertains to the process of any of Aspects 7 to 13, wherein the force is applied via a clip placed in contact with the first and second sheets of glass material.

Aspect 15 of this disclosure pertains to the process of Aspect 14, wherein the clip comprises: an elongated body having an open-ended cross-section; a first clamping surface adapted to contact a lower surface of the first sheet of glass material; and a second clamping surface adapted to contact an upper surface of the second sheet of glass material.

Aspect 16 of this disclosure pertains to the process of Aspect 15, wherein the elongated body comprises a tubular body have a C-shaped cross-section.

Aspect 17 of this disclosure pertains to the process of Aspect 15 or Aspect 16, wherein the clip further comprises an abutment edge adapted at one end of the open-ended cross-section, the abutment edge adapted to contact an edge surface of the first sheet of glass material.

Aspect 18 of this disclosure pertains to the process of any one of Aspects 14-17, wherein the clip has a length of from 5 mm to 50 mm.

Aspect 19 of this disclosure pertains to the process of any one of Aspects 8 to 13, wherein the force is applied via a hanging weight structure.

Aspect 20 of this disclosure pertains to the process of Aspect 19, wherein the hanging weight structure comprises: a suspension body; an overhang projection that extends from a first end of the suspension body over the second outer surface of the second sheet of glass material; an armature extending from a second end of the suspension body, wherein a weight is suspended from the armature; and a contact surface attached to the underside of the overhang protection, wherein the contact surface contacts the second outer surface of the second sheet of glass material.

Aspect 21 of this disclosure pertains to the process of Aspect 20, wherein the contact surface comprises a flexible strip having a V-shaped cross-section, wherein a bottom of the V-shaped cross-section contacts the second outer surface.

Aspect 22 of this disclosure pertains to the process of any of Aspects 8 to 13, wherein the force is applied via one or more counterweights arranged at or near the edges and/or corners of the first and second sheets of glass material.

Aspect 23 of this disclosure pertains to the process of any of Aspects 8 to 13, wherein the force is applied via a press that is lowered onto the second outer surface of the second sheet of glass material.

Aspect 24 of this disclosure pertains to the process of any of Aspects 8 to 13, wherein the force is applied via a flexible weight.

Aspect 25 of this disclosure pertains to the process of Aspect 24, wherein the flexible weight comprises a metal cable.

Aspect 26 of this disclosure pertains to the process of Aspect 25, wherein the metal cable comprises at least one of copper, stainless steel, nickel, a ceramic, or silver.

Aspect 27 of this disclosure pertains to the process of Aspect 24, wherein the flexible weight comprises a braided metal fabric.

Aspect 28 of this disclosure pertains to the process of Aspect 27, wherein the braided metal fabric is arranged as a hose, a tube, or a sleeve.

Aspect 29 of this disclosure pertains to the process of any of Aspects 24 to 28, wherein the flexible weight is connected to a mounting ring via at least two cables.

Aspect 30 of this disclosure pertains to the process of Aspect 29, wherein the mounting ring is connected to the shaping frame.

Aspect 31 of this disclosure pertains to the process of any of Aspects 24 to 30, wherein the flexible weight causes no optical distortions during the process.

Aspect 32 of this disclosure pertains to the process of any of Aspects 24 to 31, wherein a fabric or layer comprising at least one of copper, stainless steel, nickel, a ceramic, or silver is provided between the flexible weight and the first glass sheet and the second glass sheet.

Aspect 33 of this disclosure pertains to the process of any of the preceding Aspects 1 to 32, wherein a layer of separation material separates the first sheet of glass material from the second sheet of glass material.

Aspect 34 of this disclosure pertains to the process of any of the preceding Aspects 1 to 33, wherein the first sheet of glass material has a first composition with a first viscosity during heating that is different than a second viscosity of the second sheet of glass material during heating, the second sheet of glass material having a second glass composition.

Aspect 35 of this disclosure pertains to the process of any of the preceding Aspects 1 to 34, wherein the first glass composition is soda lime glass and the second glass composition is an alkali aluminosilicate glass composition or an alkali aluminoborosilicate glass composition.

Aspect 36 of this disclosure pertains to the process of any of the preceding Aspects 1 to 35, wherein the first sheet of glass material has an average thickness, T1, and the second sheet of glass material has an average thickness, T2, wherein T1 is different than T2.

Aspect 37 of this disclosure pertains to the process of Aspect 36, wherein T1 is at least 2.5 times greater than T2 or T2 is at least 2.5 times greater than T1.

Aspect 38 of this disclosure pertains to the process of Aspect 36, wherein T1 is between 1.5 mm and 4 mm, and T2 is between 0.3 mm and 1 mm.

Aspect 39 of this disclosure pertains to the process of any of the preceding Aspects 1 to 38, wherein, after the heating step, the first inner surface of the first sheet of glass material and the second inner surface of the second sheet of glass material are separated by no more than 0.5 mm at any point over the extent of the first and second inner surfaces.

Aspect 40 of this disclosure pertains to a curved glass laminate article, comprising: the first sheet of glass material and the second sheet of glass material co-formed according to the process of any one of Aspects 1 to 39; and a polymer interlayer binding the first sheet of glass material to the second sheet of glass material.

Aspect 41 of this disclosure pertains to a method of forming a glass laminate article, the method comprising the steps of: placing a first sheet of glass material on a support surface of a shaping frame, the shaping frame defining an open central cavity surrounded at least in part by the support surface; placing a second sheet of glass material over the first sheet of glass material, wherein the first sheet of glass material and the second sheet of glass material are both supported by the shaping frame; heating the first sheet of glass material and the second sheet of glass material together while supported by the shaping frame such that central regions of the first and second sheets of glass material deform downward into the open central cavity of the shaping frame and the first and second sheets of glass material are co-formed to have similar curvatures; controlling a pressure in a space between the first sheet of glass material and the second sheet of glass material during at least a portion of the heating; and bonding the first sheet of glass material to the second sheet of glass material.

Aspect 42 of this disclosure pertains to the method of Aspect 41, wherein controlling the pressure in the space further comprises creating a low pressure region at or near one or more of the edges and/or corners of the first and second sheets of glass material.

Aspect 43 of this disclosure pertains to the method of Aspect 41, wherein controlling the pressure in the space further comprises applying a force at or near one or more edges and/or corners of the first sheet of glass material and of the second sheet of glass material to prevent an influx of fluid into the space.

Aspect 44 of this disclosure pertains to the method of Aspect 41, wherein the force is from 0.1 N to 1 N.

Aspect 45 of this disclosure pertains to the method of Aspect 43 or Aspect 44, wherein the force is applied over a distance of 6 mm.

Aspect 46 of this disclosure pertains to the method of any one of Aspects 43 to 45, wherein the force is applied within 20 mm of an edge of the first and second sheets of glass material.

Aspect 47 of this disclosure pertains to the method of any one of Aspects 43 to 46, wherein the force is applied via one or more clips, one or more hanging weight structures, one or more counterweights, a press that is lowered on to an upper surface of the second sheet of glass material, or a flexible weight.

Aspect 48 of this disclosure pertains to the method of any of Aspects 41 to 47, wherein the first sheet of glass material has a first glass composition that is soda lime glass and the second sheet of glass material has a second glass composition that is an alkali aluminosilicate glass composition or an alkali aluminoborosilicate glass composition.

Aspect 49 of this disclosure pertains to the method of any of Aspects 41 to 48, wherein bonding the first sheet of glass material to the second sheet of glass material further comprises depositing a polymer interlayer between the first sheet of glass material and the second sheet of glass material.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A process for co-forming a stack of glass sheets to have similar curvatures, the process comprising:
   placing a first sheet of glass material on a support surface of a shaping frame, the shaping frame defining an open central cavity surrounded at least in part by the support surface;
   placing a second sheet of glass material over the first sheet of glass material, wherein the first sheet of glass material and the second sheet of glass material are both supported by the shaping frame;
   heating the first sheet of glass material and the second sheet of glass material together while supported by the shaping frame such that central regions of the first and second sheets of glass material deform downward into the open central cavity of the shaping frame; and
   during at least a portion of the heating, controlling a flow of fluid in a space between the first sheet of glass material and the second sheet of glass material at or near one or more of the edges and/or corners of the first and second sheets of glass material,
   wherein the first sheet of glass material comprises a first outer surface and a first inner surface opposite the first outer surface, and the second sheet of glass material comprises a second outer surface and a second inner surface opposite the second outer surface, the first inner surface facing the second inner surface when the first sheet of glass material and the second sheet of glass material are both supported by the shaping frame.

2. The process of claim 1, wherein the controlling the flow of the fluid into the space comprises minimizing separation of the first sheet of glass material and the second sheet of glass material at or near one or more of the edges and/or corners.

3. The process of claim 1, wherein the controlling the flow of the fluid into the space comprises creating a low pressure region at or near one or more of the edges and/or corners of the first and second sheets of glass material.

4. The process of claim 3, wherein controlling the flow of fluid into the space comprises flowing a fluid under pressure at or near one or more of the edges and/or corners of the first and second sheets of glass material to create the low pressure region.

5. The process of claim 1, wherein controlling the flow of the fluid into the space comprises applying a force at or near one or more of the edges and/or corners or over a surface of the first sheet of glass material and of the second sheet of glass material.

6. The process of claim 5, wherein the force is applied via a clip placed in contact with the first and second sheets of glass material.

7. The process of claim 6, wherein the clip comprises:
   an elongated body having an open-ended cross-section;
   a first clamping surface adapted to contact a lower surface of the first sheet of glass material; and
   a second clamping surface adapted to contact an upper surface of the second sheet of glass material.

8. The process of claim 7, wherein the elongated body comprises a tubular body have a C-shaped cross-section.

9. The process of claim 7, wherein the clip further comprises an abutment edge adapted at one end of the open-ended cross-section, the abutment edge adapted to contact an edge surface of the first sheet of glass material.

10. The process of claim 5, wherein the force is applied via a hanging weight structure.

11. The process of claim 10, wherein the hanging weight structure comprises:
    a suspension body;
    an overhang projection that extends from a first end of the suspension body over the second outer surface of the second sheet of glass material;
    an armature extending from a second end of the suspension body, wherein a weight is suspended from the armature; and
    a contact surface attached to the underside of the overhang protection, wherein the contact surface contacts the second outer surface of the second sheet of glass material.

12. The process of claim 5, wherein the force is applied via one or more counterweights arranged at or near the edges and/or corners of the first and second sheets of glass material.

13. The process of claim 5, wherein the force is applied via a press that is lowered onto the second outer surface of the second sheet of glass material.

14. The process of claim 5, wherein the force is applied via a flexible weight.

15. The process of claim 14, wherein the flexible weight comprises a metal cable.

16. The process of claim 14, wherein a fabric or layer comprising at least one of copper, stainless steel, nickel, a ceramic, or silver is provided between the flexible weight and the first glass sheet and the second glass sheet.

17. The process of claim 1, wherein a layer of separation material separates the first sheet of glass material from the second sheet of glass material.

18. The process of claim 1, wherein the first sheet of glass material has a first composition with a first viscosity during heating that is different than a second viscosity of the second sheet of glass material during heating, the second sheet of glass material having a second glass composition.

19. The process of claim 1, wherein the first glass composition is soda lime glass and the second glass composition is an alkali aluminosilicate glass composition or an alkali aluminoborosilicate glass composition.

20. The process of claim 1, wherein the first sheet of glass material has an average thickness, T1, and the second sheet of glass material has an average thickness, T2, wherein T1 is different than T2.

* * * * *